US009092236B1

(12) United States Patent
Jung

(10) Patent No.: US 9,092,236 B1
(45) Date of Patent: Jul. 28, 2015

(54) ADAPTIVE INSTRUCTION PREFETCHING AND FETCHING MEMORY SYSTEM APPARATUS AND METHOD FOR MICROPROCESSOR SYSTEM

(76) Inventor: Yong-Kyu Jung, College Station, TX (US)

( * ) Notice: Subject to any disclaimer, the term of this patent is extended or adjusted under 35 U.S.C. 154(b) by 702 days.

(21) Appl. No.: 13/487,252

(22) Filed: Jun. 4, 2012

Related U.S. Application Data

(60) Provisional application No. 61/493,489, filed on Jun. 5, 2011, provisional application No. 61/507,135, filed on Jul. 13, 2011.

(51) Int. Cl.
*G06F 9/30* (2006.01)
*G06F 9/45* (2006.01)

(52) U.S. Cl.
CPC ....................................... *G06F 8/443* (2013.01)

(58) Field of Classification Search
CPC ......................................................... G06F 8/443
See application file for complete search history.

(56) References Cited

U.S. PATENT DOCUMENTS

| | | | |
|---|---|---|---|
| 5,187,793 A * | 2/1993 | Keith et al. | 712/225 |
| 5,212,794 A * | 5/1993 | Pettis et al. | 717/153 |
| 5,509,130 A * | 4/1996 | Trauben et al. | 712/215 |
| 5,850,553 A * | 12/1998 | Schlansker et al. | 717/155 |
| 5,999,739 A * | 12/1999 | Soni et al. | 717/156 |
| 6,047,368 A | 4/2000 | Arya | |
| 6,167,536 A | 12/2000 | Mann | |
| 7,181,597 B2 | 2/2007 | Miller et al. | |
| 7,269,715 B2 | 9/2007 | Le et al. | |
| 8,245,208 B2 * | 8/2012 | Eichenberger et al. | 717/150 |
| 8,527,969 B2 * | 9/2013 | Meyers et al. | 717/139 |
| 2001/0049818 A1 * | 12/2001 | Banerjia et al. | 717/9 |
| 2004/0059897 A1 * | 3/2004 | Rose et al. | 712/233 |

* cited by examiner

*Primary Examiner* — Philip Wang

(57) ABSTRACT

A method and system of prefetching and fetching processor instructions is designed for reduced code fraction, for scaled packed instructions before runtime, and for adaptive, concurrent instruction prefetch and fetch at runtime. The invention is designed for reducing energy consumption of the instruction cache memories by accurately accessing the instructions that will be executed and by terminating instruction prefetch after prefetching instructions from the possible paths. The invention is also designed for improving performance by reducing branch instructions and by prefetching and fetching instructions adaptively. In particular, compiled native instructions are converted to mixed packed nonnative and non-packed native instructions for generating more streamlined code and storing the native instructions of the packed instructions in dedicated, separate regions of distinct addresses in the concurrent accessible instruction cache and main memories. The packed instructions are dynamically reverted to native instructions to be prefetched and fetched concurrently.

20 Claims, 6 Drawing Sheets

ADAPTIVE INSTRUCTION PREFETCHING AND FETCHING MEMORY SYSTEM APPARATUS AND METHOD FOR MICROPROCESSOR SYSTEM

TECHNICAL FILED OF THE DISCLOSURE

The invention relates to converting native instructions in a program to mixed packed nonnative and non-packed native instructions (PINIs) and native instructions of the packed nonnative instructions (NIPIs) or to generating PINIs and NIPIs at software compilation time and to reverting the packed nonnative instructions (PANIs) to purely native instructions at runtime.

The invention relates to the conversion of the software program in prior arts to the branch reduced or eliminated, shortened and compatible program that allows a single or plurality of microprocessors to keep fetching and executing the native instructions with significantly reduced code fraction. In particular, the invention relates to the usage of the non-packed native and/or scaled PANIs including branch-hidden loop, non-duplicated inline expanded subroutine, and/or other PANIs in various continuously changing software programs after manufacturing microprocessor systems.

The invention relates to prefetching and fetching a single or plurality of the PINIs and/or NIPIs from a single or plurality of the main memories to the single or plurality of microprocessors concurrently via a single or plurality of instruction cache memories if necessary. The invention also relates to the conservation of instruction cache memory size and operating energy by accurately prefetching and fetching the instructions that will be used by the single or plurality of microprocessors. Furthermore, the invention relates to the reduction of the instruction cache miss and the flow control instruction (i.e., branch miss prediction) penalties for improving the computing performance of the software program (i.e., assembly and/or machine language program) executed by the single or plurality of microprocessors.

The invention relates to distinguishing PINIs, including the PANIs for accessing the associated NIPIs, from a single or plurality of main memories via the single or plurality of instruction cache memories during the instruction prefetching and fetching time. More specifically, the invention relates to providing the same or a similar effect of concurrent instruction prefetching of a single or plurality of native instructions on the program flow by accessing dedicated, separate regions of distinct addresses in a hierarchical memory system unlike simply prefetching as many instructions as possible without evaluating the usage of the prefetched instructions as done in prior arts.

The invention relates to the initiation and termination of access to the NIPIs, concurrently placing the NIPIs to the single or plurality of instruction cache memories, and delivering purely native instructions of the PINIs to the single or plurality of microprocessors. The invention also relates to the prefetch of the next prospective single or plurality of PINIs. In particular, the invention relates to accessing native instructions from the consecutive and/or the branch target locations if a native branch instruction is identified by the adaptive instruction prefetching and fetching memory system.

The invention relates to the software security used for preventing malicious and illegal copying of software programs.

BACKGROUND OF THE DISCLOSURE

The present invention relates generally to instruction memory system, and more specifically, it relates to an adaptive instruction prefetching and fetching memory system apparatus and method for microprocessor system to reduce code fraction, to scale code for packing native instructions at software compilation time, and to adaptively, concurrently prefetch PINIs and NIPIs, and fetch purely native instructions at runtime.

The adaptive instruction prefetching and fetching memory system apparatus and method for microprocessor system is designed for reducing instruction cache memory area and operating energy, enhancing access time, resolving or lightening the cost of instruction cache miss penalty, and improving the overall performance of the microprocessor system. The adaptive instruction prefetching and fetching memory system apparatus and method for microprocessor system uses an adaptive instruction prefetching and fetching system integrated with a concurrently accessible hierarchical memory system consisting of a single or plurality of caches and main memories to achieve the same or a similar effect of concurrent instruction prefetching and fetching of a single or plurality of native instructions.

The invented adaptive instruction prefetching and fetching memory system adaptively prefetches and/or fetches a single or plurality of PINIs concurrently while delivering a single or plurality of fetched native instructions to the single or plurality of microprocessors in their programming order. The adaptive instruction prefetching and fetching memory system distinguishes the prefetched and fetched PANIs and non-packed native instructions in PINIs from the single or plurality of main instruction memories via a single or plurality of levels of instruction cache memories before delivering the purely native instructions to the single or plurality of microprocessors.

The invented adaptive instruction prefetching and fetching memory system is capable of prefetching the single or plurality of the NIPIs from the single or plurality of associative locations of the single or plurality of main instruction memories via the single or plurality of levels of instruction cache memories by passing a single or plurality of addresses of the PANIs in the PINIs to a single or plurality of locations in the main and/or cache memories accordingly. The invention prefetches the next prospective single or plurality of PINIs while delivering both the NIPIs and/or non-packed native instructions in the PINIs to the single or plurality of microprocessors.

In order to reduce code fraction, the invention generally packs basic blocks, which are segments of native instructions between two instructions that are branch and branch target instructions and vice versa. The branch instructions—both conditional and unconditional branches—provide their branch target locations if possible. A non-deterministic branch target location that cannot be obtained at the compilation time can be obtained after a single or plurality of program simulations if possible.

In addition, the branch target locations can be obtained from the associated branch target buffers or similar components if necessary. A branch target instruction can be any instruction at a branch target location. The PANI is a native instruction segment packed as a single nonnative instruction. In particular, a PANI contains a single or plurality of native and/or PANIs in a single instruction form as a PINI statically composed at compilation time. A PANI consists of the branch instructions with non-branch instructions, all of the instructions in a loop or a subroutine, or all of the non-branch or branch target instructions. A PANI is comprised of multiple non-packed native and/or PANIs.

Two types of codes are obtained from the software compiled program, such as the assembly program, after another round of compilation. The first type of code contains PINIs. The second type of code contains NIPIs. Alternatively, this static code conversion can be integrated to the software compilation. Instructions of both the first and second types of code are concurrently prefetched and/or fetched through separate paths of the invented memory system if necessary. Therefore, the PANIs are considered as kinds of subroutine callers. The NIPIs are bodies of the subroutines. These bodies of the subroutines are only fetched after prefetching both the subroutine callers and bodies of the subroutines. This results in the better match between the high-level programming style comprising of a main program including a plurality of function callers and the associative functions and the assembly programming style, which causes a plurality of code fractions in prior arts.

A non-packed native instruction is a native instruction of the target microprocessor. A non-packed native instruction is a native instruction that is not packed with any other native and/or PANI. On the other hand, a PANI represents a segment of the native instructions appearing in the program.

The PANIs are composed by converting segments of native instructions in basic blocks including loops and subroutines, and parts of the sequential instructions in any non-fractional parts of the program, and by assigning segments of the native instructions to individually PANIs. A non-fractional part of the program must contain a segment of a single or plurality of instructions including only non-branch and non-branch target instructions. The PANIs contain associative opcodes and/or other information, such as start and/or end locations of the native instruction segments of the PANIs, the number of instructions packed in each PANI, and so on, for the PINI prefetching and fetching memory system to distinguish PANIs from a PINI as well as to identify the native flow control instructions, such as branch instructions.

The adaptive instruction prefetching and fetching memory system apparatus and method for microprocessor system distinguishes PANIs for adaptively and concurrently accessing a single or plurality of native instructions of the single or plurality of PANIs from the dedicated, separate regions of distinct addresses in instruction cache and/or main memories if necessary.

The adaptive instruction prefetching and fetching memory system apparatus and method for microprocessor system permits reducing the number of branch instruction appearances, and provides the same instruction fetching capability of the native instructions in PINIs. In addition, the adaptive instruction prefetching and fetching memory system apparatus and method for microprocessor system allows the adaptive usage of different sizes of instruction cache memory by scaling PANIs to achieve functional compatibility and performance enhancements.

Therefore, the adaptive instruction prefetching and fetching memory system apparatus and method for microprocessor system adaptively handles the instructions converted from the original native instruction segments in the program to the PINIs and NIPIs. Alternatively, the invention directly generates the PINIs and NIPIs from software written in high-level programming language such as C/C++.

The adaptive instruction prefetching and fetching memory system apparatus and method for microprocessor system effectively utilizes available instruction cache memories in terms of the cache memory size, power consumption, and operational speed. In addition, the invention permits considerably conserving instruction cache memory or simplifying the cache organization from the hierarchical instruction memory system. The invention also prefetches the PINIs on the prospective locations in the program flow concurrently for enhancing cache hit rate. Furthermore, the invention prevents the instruction cache memories from wasting energy by accurately prefetching and fetching the instructions that are highly used once they have been accessed and stored in the instruction cache memories. Since more operations, including branches, subroutine callers, and subroutine returns, are reduced and/or packed into PANIs, which are stored in and accessed from small, simple, and low-power cache memories, such as direct mapped cache memories, the invention is useful for low-power and performance-aware microprocessors. Through this invention, developers can: (1) compose their own compatible and ciphered instructions before runtime; and (2) prefetch and fetch purely native instructions concurrently from the single or plurality of main memories via the single or plurality of levels of cache memories.

Problems of the Art

Emerging handheld devices, such as smartphones, run the same capabilities of software as computers. Since this trend derives the performance obsession of such embedded computing systems, embedded processor platforms employed in the handheld systems face significant performance challenges. The handheld devices also inherently require low-power operations. In particular, instruction cache in an embedded system may be responsible for more than a quarter of a processor's overall power consumption. Furthermore, high code fractions in embedded software require extra energy budget.

Instruction-set processors have evolved to mitigate the memory bandwidth problems. Inherently, von Neumann-based processors provide extreme flexibility with software programmed in the procedural manner after fabrication. Binary software is stored to instruction memories (e.g., ROMs) and fetched to the processors via fast cache memories. Due to flow controls in the nature of temporal software, instruction streams are often disturbed. Pipelined architectures, including superscalar and very-long instruction word (VLIW), increase the difficulty of handling such flow control issues by paying fewer penalties while simultaneously processing multiple instructions in the pipeline. In order to reduce these flow control penalties, microprocessors need to know the direction and target address of the next instruction so that software (e.g., compiler) designers can foresee the flow of instruction streams before runtime. Thus, designers continuously develop branch prediction techniques [1, 2] and fetch engines [3] to address the ongoing penalty problem.

Three basic performance detractors—cache miss rate, branch misprediction, and instruction access time—are identified in [4]. Traditionally, compilers optimize software codes to alleviate performance degradation related to detractors. This static software code optimization and related techniques—i.e., software pipelining [5, 6]—are introduced to reduce the burden of hardware. In contrast, dynamic binary translation-based approaches optimize binary software codes at runtime [7, 8]. A dynamic code optimization approach [9] employs code generation at load-time and continuous source-code optimization at runtime for optimally matching software with hardware while improving instruction-level parallelism.

To provide sufficient visibility in instruction-fetch architectures, a block-aware instruction-set architecture (BLISS) [4] was introduced to facilitate flow control prediction. Basic block descriptors provide the types of flow control operations, such as the basic block termination, potential target instructions, and so on. These block descriptors not only eliminate instruction-cache latency from the critical path of accurate prediction but also offer a flexible mechanism for further improvements in program code density, power reduction, and hardware complexity. In contrast to prior arts, the invention significantly alleviates the judicious use of fetch engines such as branch predictors, because a group of the qualified flow control instructions is already removed from the assembly program; a group of the known-target flow control instructions is efficiently handled by loading branch target instruction before determining the branch operation.

U.S. Pat. No. 5,509,130 [10] describes packing and issuing instructions simultaneously per clock cycle for execution. An instruction queue stores sequential instructions of a program and branch target instruction(s) of the program, both of which are fetched from the instruction cache. The instruction control unit decodes the sequential instructions, detects operands cascading from instruction to instruction, and groups instructions according to a number of exclusion rules which reflect the resource characteristics and the processor structure. This approach, however, groups instructions after fetching sequential instructions from the instruction cache. Therefore, it still requires maintaining at least the same size of the instruction cache. It also requires involving branch prediction and resolution hardware units for branch instructions because of packing at runtime. Consequently, the instruction cache, branch prediction, and resolution-related hardware cannot be reduced.

U.S. Pat. No. 6,047,368 [11] claims that an instruction packing apparatus employs a compatibility circuit including translation and grouper circuits where the translation and grouper circuits, respectively, transform old instructions to new instructions as simpler forms and group instructions based on instruction type by hardware when transferring a cache line from the memory to instruction cache. In order to identify a PANI, the invention [11] deploys identifiers for groups and functionality during translation. Although the dynamical packing and identifying of assigned functionalities of the PANIs issue and execute concurrently, this approach focuses only on increasing instruction level parallelism while paying additional hardware cost. Unlike the adaptive instruction prefetching and fetching system apparatus, U.S. Pat. No. 6,047,368 [11] does not physically reduce the bit-length of instructions. Therefore, this approach still requires at least the same or more instruction cache, which causes the same or more energy consumption.

U.S. Pat. No. 7,269,715 [12] presents an improved method and apparatus for packing instructions processed in the same sized instruction sets. This approach distinguishes a current set of instructions received as part of a group including a prior set of instructions using a history data structure. In addition, this approach recognizes a critical path or bottleneck to break apart incoming instructions into special groups or formations during the instruction fetch between a secondary memory and the instruction cache. The packed or reformatted nonnative instructions with a packing indication are issued to the execution units. This approach requires additional hardware, such as grouper circuit and translation circuit.

A trace cache [13] is presented that contains decoding information of the instructions consecutively executed before. In order to achieve higher throughput from superscalar processors, fetching multiple basic blocks per cycle becomes necessary. In addition, conventional instruction cache memories hinder the multiple-block fetching per cycle because instructions in the blocks are not always in contiguous locations in the cache memories. The trace cache supplements conventional instruction cache by dynamically tracing the instruction stream and contiguously locating the instructions. The trace cache directly passes the decoding information when the same instruction stream is decoded. Consequently, performance enhancement and high bandwidth instruction fetching can be achieved with the trace cache. However, this approach heavily relies on the capability of employing branch prediction hardware for performance improvement. The trace cache approach must obtain decoding results after dynamically decoding the same instructions. The trace cache approach cannot hold all of the traces of the multiple blocks without increasing the trace cache size. Furthermore, this approach must redecode and keep the trace of the decoded results of the instruction block if the trace of the same block is changed.

U.S. Pat. No. 6,167,536 [14] presents an on-chip instruction trace cache capable of providing information for reconstructing instruction execution flow. In particular, U.S. Pat. No. 6,167,536 [14] presents the instructions that disrupt the instruction flow by branches, subroutines, and data dependencies. Therefore, this approach allows less expensive external capture hardware to be utilized and also alleviates various bandwidth and clock synchronization issues confronting many existing solutions.

U.S. Pat. No. 7,181,597 [15] provides enhanced performance by employing a trace cache. In particular, this approach decodes the first instruction into a single or plurality of operations with a decoder. The decoder passes the first copy of the operations to a build engine associated with a trace cache. In addition, the decoder directly passes the second copy of the operation to a back end allocation module in a decoder. This approach enhances performance by selectively bypassing a trace cache build engine.

One of the viable approaches to improving the performance of a microprocessor is increasing the concurrent and speculative execution of multiple instructions. This high instruction level parallelism can be achieved by eliminating or reducing data and/or control flow constraints. Data flow is caused by insufficient resources and parallel execution of instructions. In contrast, unpredictable branch instructions cause control flow problems. Removing data/control flow problems permits formatting larger blocks of instructions to achieve higher instruction level parallelism. Typically, adding more hardware resources, such as functional units and register files, with non-blocking caches and pipelined functional units alleviates data flow restrictions. Speculative execution and software pipelining have been used for reducing the control flow problems.

Cache may consume up to 50% of a processor's total power [16]. For instance, in the StrongArm SA110, caches consume almost 43% of overall power; instruction cache is responsible for 27% (i.e., data cache has 23%) of the total energy consumption [17]. Caches are faster than the main memory and consume less power per access than does the main memory. As the number of transistors on the chip increases, the cache size also increases. On-chip caches present a major contribution to the transistor budget. For instance, approximately 90% of the transistors are dedicated to cache structures in the Itanium 2 processor and the power consumption in processor chips [18].

Simulation results of the priori power breakdown for a 4-wide issue, in-order processor show that instruction and data caches reach to almost 60% (each has about 29%). However, the actual dynamic power breakdown after executing an application is different since the instruction cache is accessed more frequently than the data cache. Experimental results show that an average of the instruction caches accounts for 43% of the total processor power, which is 14% greater than one in the priori power breakdown for the MiBench benchmark suite [19]. Thus, optimizing energy consumption in caches is of foremost importance in processor designs.

Multimedia applications have a few small loops that are executed a large number of times compared with other applications in SPEC-2000 [20]. Regardless of applications, conditional branches represent a significant fraction of total instructions executed in a program. In the MediaBench/Mibench suites, over 75% of conditional branch instructions jump fewer than 16 instructions, while almost 50% of the branch instructions jump within just 6 instructions. In details, researchers also found 16 or fewer instructions in 75% of the loops in the MediaBench and 30 or fewer instructions in 95% and 90% of the loops in the MediaBench and SPEC-2000, respectively [21]. Therefore, the key features of software fetched via instruction cache can be summarized as follows: (1) most of the branches do not jump far; (2) on average, a branch instruction is allocated after every seven instructions; and (3) each program spends most of its time within certain blocks.

Instruction cache fetch becomes much wider and typically involves fetching an entire line. However, because of the high frequency of taken branches in applications, all instructions in an instruction cache block may not actually be used. For example, the instruction fetch unit accounts for 14% of the total power dissipation in Intel's Pentium-Pro processor [22]. In order to mitigate this fraction of taken branches and the fraction of unused instructions, many complex instruction cache architectures (e.g., trace/content-addressable-memory (CAM)/other configurable caches) have been developed.

These specific caches allow saving up to 50% of the instruction cache energy. Especially, CAM tags in highly-associative instruction and data caches show about 48% of instruction cache energy saving, which is equivalent to 19% of overall processor energy reduction, although they consume 5 to 10 times more energy than the same size of SRAM-tag array [23]. This power hungry nature is compensated by the high associativity. This means that higher hit rate with complex caches is more desirable for energy saving than using simple low-powered direct mapped caches. For these reasons, the energy consumption of both the instruction cache and the instruction fetch unit is a major design concern in current and next-generation low-power processors.

Furthermore, more and more features have been added to caches in order to squeeze out additional power saving. A direct mapped cache, which has a simplified structure, has a much lower per access energy consumption (i.e., about 40%) than the same sized set associative cache [24]. In addition, a direct mapped cache has faster access time because it does not have a multiplexor that is employed by a set associative cache. However, the direct mapped cache has poorer hit rates than the same sized set associative one. This results in more memory access causing both energy and time costs.

Improving programmability contributes to performance enhancement as well as instruction cache hit rate. Since processors are generally not capable of extending their instructions after manufacturing, they usually are equipped with a large number of instructions. Practically, fewer than 20% of instructions are frequently used for commercial benchmarks. For example, up to 40 and 20 instructions, respectively, provide 100% and 95% overall coverage per program in MiBench. More than 55% of instructions execute less than just 1% of the total execution time [25]. Thus, adding more and more instructions to a processor may be not an effective means to sufficiently enhance instruction cache hit rate so that a direct mapped cache can provide a desired hit rate that will replace at least the same size of a set associative cache.

The basic detractors no longer cause performance degradation in the microprocessor system with the invented adaptive instruction prefetching and fetching system including cache memories holding scaled PINIs in which limited amounts of non-packed native and/or adaptively PANIs are contained. Since large amounts of instructions, including branches, can be packed and converted as adaptively scaled instructions, instruction cache miss rate is radically decreased. In other words, different sizes of cache memory can be used for better or at least equal performance. For instance, the invention deals with adaptively scaled PANIs that include qualified loops and/or qualified subroutines with branch instructions and converts them to a single PINI. Branch prediction, therefore, is not necessary as each adaptively PANI executes correct branch operations at runtime with the operations of the entire loop/subroutine enclosed.

Since an adaptively PANI in the invention is reverted to identical or shortened native instructions as those of all of the native instructions with branches during its fetch through the adaptive instruction prefetching and fetching memory system, the same microprocessor continues to execute the adaptively fetched native instructions. Since each adaptively PANI (e.g., a loop or a subroutine) generally contains more than one native instruction, the reverted single or plurality of NIPIs is prefetched in concurrent manners. Therefore, multi-cycle instruction cache or even longer main memory access time can be compensated by prefetching early an ample number of native instructions as a single adaptively PANI concurrently and fetching the prefetched instructions in the program order.

In addition, the number of instructions packed into each PANI is scaled in order to balance the instruction cache memory usage by addressing the native instructions of the consecutively located PANIs to the dedicated, separate regions in instruction cache and/or main memories (i.e., cache/memory banks, dual or multiple ports memories, and so on). Consequently, the balanced instruction cache memory usage in the invention reduces unused or frequently replaced cache lines according to the associated cache replacement policy. Analyzed instruction flow during the software compilation can be used for this purpose. It is also useful in that the invention allows for parallel instruction prefetch from the main memory to the upper-level cache (i.e., L2 cache) and pipelined instruction prefetch from the upper-level cache to the lower-level cache (i.e., L1 cache) according to the tradeoff between access per power consumption and the number of concurrently fetched and/or prefetched instructions for microprocessor performance.

In order to adapt to different sizes of code, the PINI memory is partitioned according to the size of the mixed non-packed native and PANIs. For instance, the memory address of the beginning native instruction of the first PANIs is stored as a constant at a specific address in the code. This address is used for identifying the border of the NIPIs after initialization of the microprocessor.

SUMMARY OF THE DISCLOSURE

The invention generally relates to a microprocessor system consisting of a static code conversion system and a dynamic code reversion system. The static code conversion system is for converting native instructions in compiled code, such as assembly code, to PINIs and NIPIs in adaptive code before runtime. The dynamic code reversion system is for reverting the PINIs in the converted code to NIPIs and non-packed native instructions in the converted code stored in the dedicated, separate regions of distinct addresses in instruction caches and/or main memories at runtime.

The static code conversion system is for the composition of the PINIs including the PANIs and NIPIs of the associative PANIs during the compilation time. After such software compilation, two types of code are obtained. The first type of code includes PINIs, which reflects the programming order in the code. The second type of code only includes NIPIs of the associated PANIs. These two types of code are stored in dedicated, separate regions of distinct addresses in the single or plurality of instruction memories. Alternatively, the static code conversion system may directly generate the PINIs and NIPIs from software written in high-level programming language.

In order to reduce code fraction, the static code conversion system packs basic blocks, which are segments of native instructions between two instructions that are branch and branch target instructions or vice versa. In addition, the static code conversion system scales and packs the basic blocks and the qualified instruction segments for various sizes of cache memories in the dynamic code reversion system.

The static code conversion system is also designed for improving performance of microprocessors by reducing branch instructions from the code. More specifically, the static code conversion system eliminates subroutine callers and returners for native subroutine caller instructions, which jump to and return from the associated subroutines. In addition, the branch instruction in a loop is packed in order to reduce code fraction, so that the PANI can hide branch operations in the generated code. Since branch instructions of subroutines are removed from the code, the microprocessor does not need to execute a pair of branch operations for the subroutines. In other words, any unconditional branch instruction in the converted program is not fetched to the microprocessor unlike what is done in prior arts.

In addition, the static code conversion system is to properly allocate the NIPIs to the dedicated, separate regions of distinct addresses in the single or plurality of the main instruction memories. More specifically, the NIPI located right after a flow control instruction, such as a branch instruction, in the program must not be stored to the same region of addresses where the NIPI are located at the branch target location of the branch instruction.

The dynamic code reversion system consists of an adaptive instruction memory system and a microprocessor. In particular, the adaptive instruction memory system consists of a single or plurality of main instruction memories, a single or plurality of levels of the instruction cache memories in hierarchy, and an adaptive instruction prefetching and fetching system. The adaptive instruction prefetching and fetching system is for prefetching and fetching PINIs and NIPIs from dedicated, separate regions of distinct addresses in a single or plurality of instruction cache and main memories.

The PANIs in the PINIs are dynamically reverted during the instruction prefetching and/or fetching time. The reverted instructions of the PANIs are the associated NIPIs that can be executable to the target microprocessor. More specifically, both the subroutine call instruction as a PANI and the subroutine return instruction in the associative subroutine are removed during the dynamic code reversion.

The single or plurality of main and cache instruction memories in a hierarch is to hold and deliver the PINIs and NIPIs concurrently and precisely via a single or plurality of reduced size and simplified structured cache memories. More specifically, a single or plurality of PINIs are prefetched and/or fetched in parallel for more aggressive prefetching and/or fetching by starting those instructions at the same time.

There has thus been outlined, rather broadly, some of the features of the invention in order that the detailed description thereof may be better understood, and that the present contribution to the art may be better appreciated. Additional features of the invention will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide an adaptive instruction prefetching and fetching memory system apparatus and method for microprocessor system that improves the energy efficiency, cache memory conservation, cache access time, and performance of the microprocessor system, including the achievement of adaptive, accurate fetching of non-packed native and PANIs in PINIs and concurrent prefetching of NIPIs, for enhanced microprocessor throughput while maintaining compatibility of the software.

An object is to provide a static code conversion system that converts the native instructions in the assembly program compiled by the target software compiler into two types of code, PINIs and NIPIs. Alternatively, the two types of code can also be generated by a single compilation that includes the same native instruction conversion capability as the invented system. The PANIs are composed by assigning different opcodes and other information to the PANIs if needed.

Another object is to provide a static code conversion system that eliminates and/or hides branch instruction(s) from the original program and composes compatible and customized forms of the PANIs for preventing malicious and illegal copying of various software programs while fetching correct segments of the native instructions.

An object is to provide a dynamic code reversion system that distinguishes the PANIs from the PINIs for concurrently prefetching and fetching the NIPIs stored in dedicated, separate regions of distinct addresses in a single or plurality of instruction cache and main memories.

Another object is to provide a dynamic code reversion system that dynamically reverts the PINIs to purely native instructions during the instruction fetching and/or prefetching operations.

Another object is to provide a dynamic code reversion system that adaptively prefetches a single or plurality of instructions in the PINIs from the next prospective locations such as the next instruction of the flow control instruction and the instruction at the branch target location whenever fetching and/or prefetching a flow control instruction such as a branch instruction.

Another object is to provide an adaptive instruction prefetching and fetching memory system apparatus and method for microprocessor system that provides an adaptive way to satisfy the desired effective cache memory usage and performance enhancements by reducing branch prediction and cache miss penalties through the invented accurate, concurrent prefetching and fetching system, unlike memory systems employed in microprocessors in prior arts that are incapable of performing to such demands.

Another object is to provide an adaptive instruction prefetching and fetching memory system apparatus and method for microprocessor system that utilizes PANIs, which encapsulate only undisrupted native instruction segments, in the program to accurately prefetch the single or plurality of NIPIs that will be fetched and executed by the microprocessor, unlike prefetching a certain number of the native instructions that include many of the unused instructions for execution of the microprocessor in prior arts.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called, however, to the fact that the drawings are illustrative only, and that changes may be made in the specific construction illustrated and described within the scope of this application.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Figure 1:
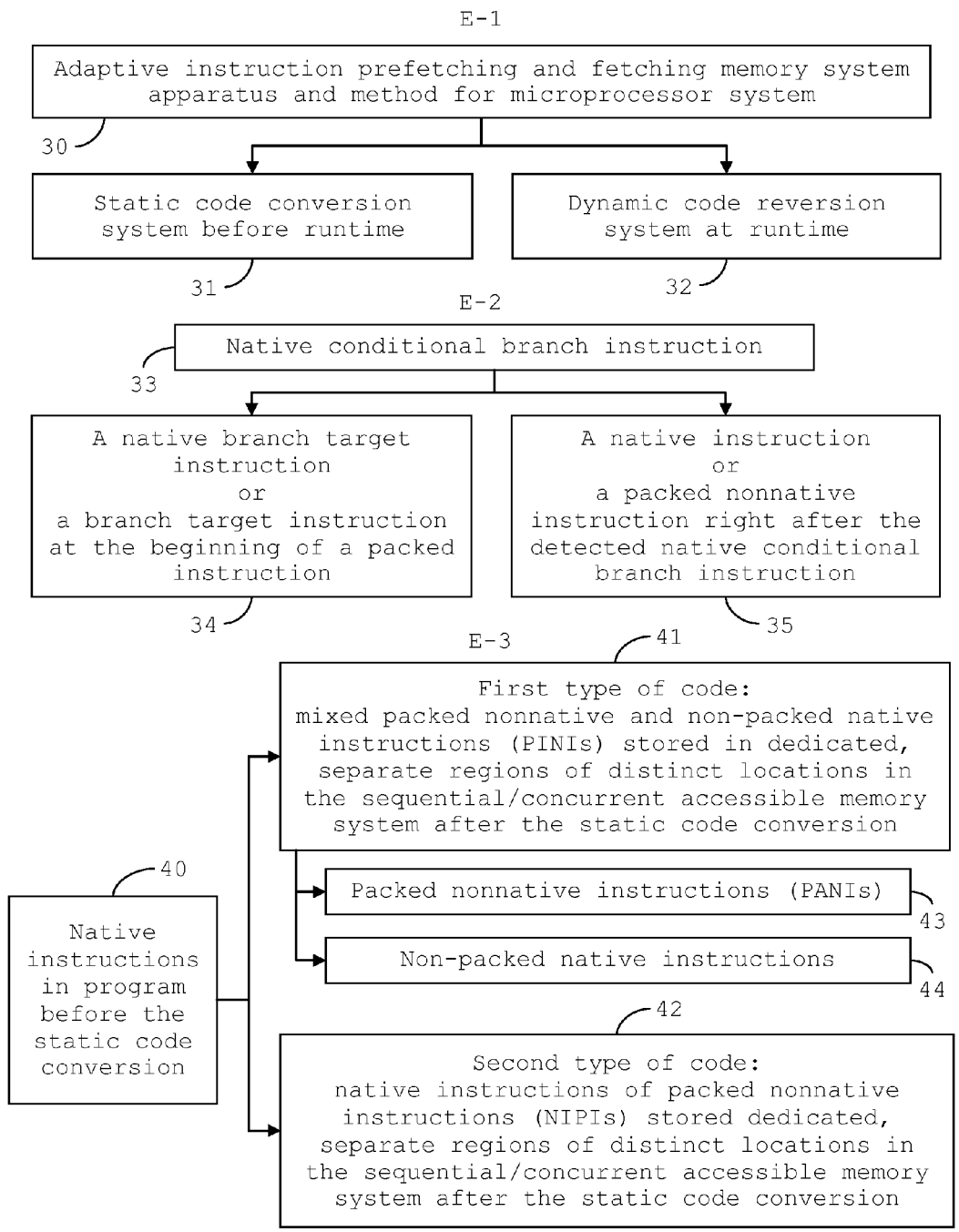
FIG. 1 is a diagram showing one embodiment of an adaptive instruction prefetching and fetching memory system apparatus and method for microprocessor system consisting of a dynamic code reversion system and a static code conversion system with a precise prefetching termination method and the invented two types of code, such as PINIs consisting of PANIs and non-packed native instructions and NIPIs, generated from the program.

FIG. 1 shows one embodiment of an adaptive instruction prefetching and fetching memory system apparatus and method for microprocessor system 30 that consists of a static code conversion system 31 and a dynamic code reversion system 32.

In one embodiment, a static code conversion system 31 converts the native instructions in a program 40, such as assembly program, to two types of code, such as the PINIs 41 and NIPIs 42 before runtime. The PINIs 41 consist of PANIs 43 and non-packed native instructions 44, such as conditional branch instructions.

In one embodiment, a dynamic code reversion system 32 reverts the PINIs 41 to the NIPIs 42 via the adaptive instruction memory (AIM) system A-3 at runtime.

In one embodiment, a precise prefetching termination method E2 is designed for the static code conversion system 31 and the converted two types of code, PINIs 41 and NIPIs 42 from the program via the AIM system A-3.

In one embodiment, the precise prefetching termination method shows when prefetching operations must be ended. In the precise prefetching termination method, when the native conditional branch instruction 33 is detected, current prefetching operations will be terminated after prefetching instructions in two different paths. The instruction prefetched from one path is a PINI, such as a native branch target instruction or branch target instruction at the beginning of a packed instruction 34. The instruction prefetched from another path is a PINI, such as a native instruction or PANI 43 right after the detected native conditional branch instruction 35. However, native unconditional branch instructions, which provide their branch target addresses, continue to prefetch and/or fetch the next instructions from the branch target locations. This unconditional branch instruction is not fetched to a microprocessor 98, but discarded after obtaining its branch target location. In order to obtain branch target addresses, various branch predictors and branch target buffers in prior arts can be used if necessary. Since any predicted conditional branch instruction in the invention is considered as an unconditional branch instruction, this branch instruction does not cause any prefetching termination. However, this conditional branch instruction is fetched to a microprocessor 98 for further processing.

The two types of code generation from the program 40 are complete after software compilation in prior arts or during the software compilation integrated with the static code conversion system 31. The static code conversion system 31 takes the output of the software compilation, for instance, assembly code, and generates two types of code, PINIs 41 and NIPIs 42.

The PINIs 41 must be stored in dedicated, separate regions of distinct locations in the sequential and/or concurrent accessible memory system after the static code conversion. The NIPI 42 must be stored in dedicated, separate regions of distinct locations in the sequential and/or concurrent accessible memory system after the static code conversion. Therefore, the PINIs 41 are reverted to NIPIs 42 of PANIs 43 and non-packed native instructions 44 of the PINIs by the dynamic code reversion system 32.

The first and second types of code 41, 42 are separately allocated to the different locations of the same or different sequential and/or concurrent accessible cache and main memories 108, 109. The employed single or plurality of levels of the cache memories in the sequential and/or concurrent accessible cache and main memories 108, 109 have the same or different sizes of the same or different number of banks that can be concurrently accessed if necessary. Multi-port cache and main memories (i.e., dual-port RAM) can also be used for allocating the first and second types of code 41, 42.

In order to prefetch NIPIs 42 concurrently, the native instructions of the consecutive PANIs 43 are allocated to the different banks in the sequential and/or concurrent accessible cache and main memories 109. In particular, the NIPI located right after a flow control instruction such as a branch instruction in the program must not be stored to the same bank where the NIPI are located at the branch target location of the branch instruction for the concurrent prefetch and/or fetch. The NIPIs are stored to the different banks of the main instruction memory 94 in the circular manner without violating the aforementioned allocation rules of the native instructions.

Figure 2:
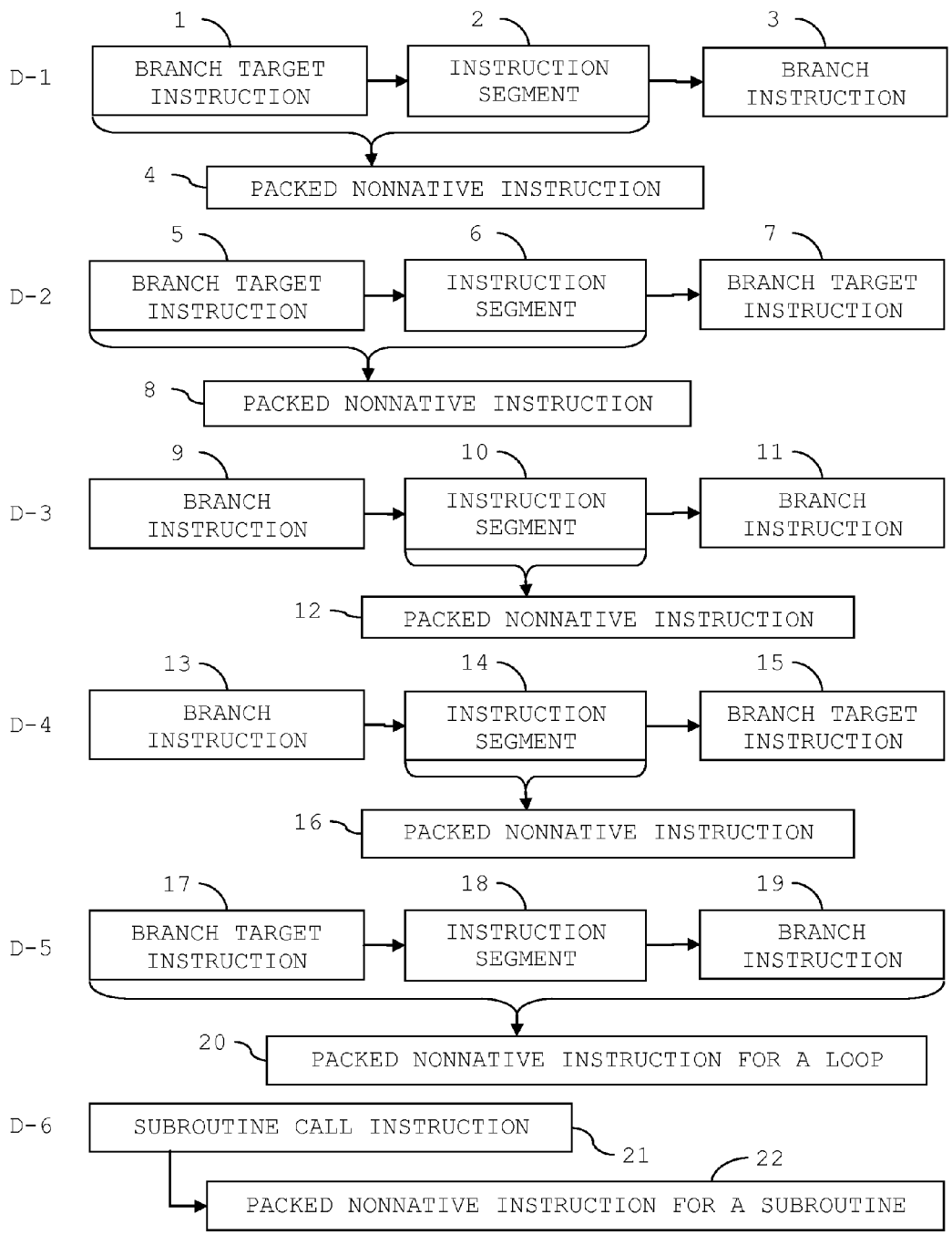
FIG. 2 is a diagram showing one embodiment of a static code conversion system for packing instructions in program and reducing the fraction of program with elimination of branch instructions and accurate instruction prefetch and fetch via the adaptive instruction memory system.

FIG. 2 is one embodiment of a static code conversion system 31 for packing instructions in program and reducing the fraction of program using elimination of branch instructions. A plurality of instruction packing methods is for reduction of branch instructions and accurate instruction prefetch and fetch via the dynamic code reversion system 32. The branch instructions include conditional and unconditional flow control instructions. The conditional branch instructions include any flow control instructions that cannot determine their branch operations and/or target branch locations before runtime. If any branch prediction scheme is used for obtaining the branch target location of a conditional branch instruction, this conditional branch instruction is considered as an unconditional branch instruction for the dynamic code reversion system 32. This results in significant code fraction. Therefore, the instructions can be continuously and swiftly prefetched and fetched.

The first instruction packing method D-1 packs the instruction 1 from the branch target location to before the nearest branch instruction 3. As a result, a PANI 4 is created. The instruction segment 2 between the branch target instruction 1 and the branch instruction 3 does not include any branch instructions or branch target instructions.

The second instruction packing method D-2 packs the instruction 5 from the branch target location to before the nearest branch target instruction 7. As a result, a PANI 8 is created. The instruction segment 6 between the branch target instruction 5 and the branch instruction 7 does not include any branch instructions or branch target instructions.

The third instruction packing method D-3 packs the instruction segment 10 between the branch instruction 9 and the nearest branch instruction 11. As a result, a PANI 12 is created. The instruction segment 10 between the branch instruction 9 and the branch instruction 11 does not include any branch instructions or branch target instructions.

The fourth instruction packing method D-4 packs the instruction segment 14 between the branch instruction 13 and the nearest branch target instruction 15. As a result, a PANI 16 is created. The instruction segment 14 between the branch instruction 13 and the branch target instruction does not include any branch instructions or branch target instructions. Any instruction segment can be scaled and packed in the invention.

In order to reduce branch operation in the program, loops and subroutine callers are also packed as seen in FIG. 1. The fifth instruction packing method D-5 packs a loop consisting of the branch target instruction 17 at the beginning of the loop, the instruction segment 18, and the branch instruction 19 at the end of the loop. As a result, a PANI 20 is created. The instruction segment 18 between the branch target instruction 17 and the branch instruction does not include any branch instructions or branch target instructions. The fifth instruction packing method is also applicable for packing multi-level loops by packing the outer loop after packing the inner loop. In this case, the instruction segment 18 can include a PANI for a loop.

The sixth instruction packing method D-6 replaces a subroutine call instruction 21 with the PANI of the body of the associated subroutine which does not include a subroutine return instruction. This PANI 22 permits the microprocessor to not execute a subroutine call and an associated subroutine return operation while maintaining functional compatibility.

Figure 3:
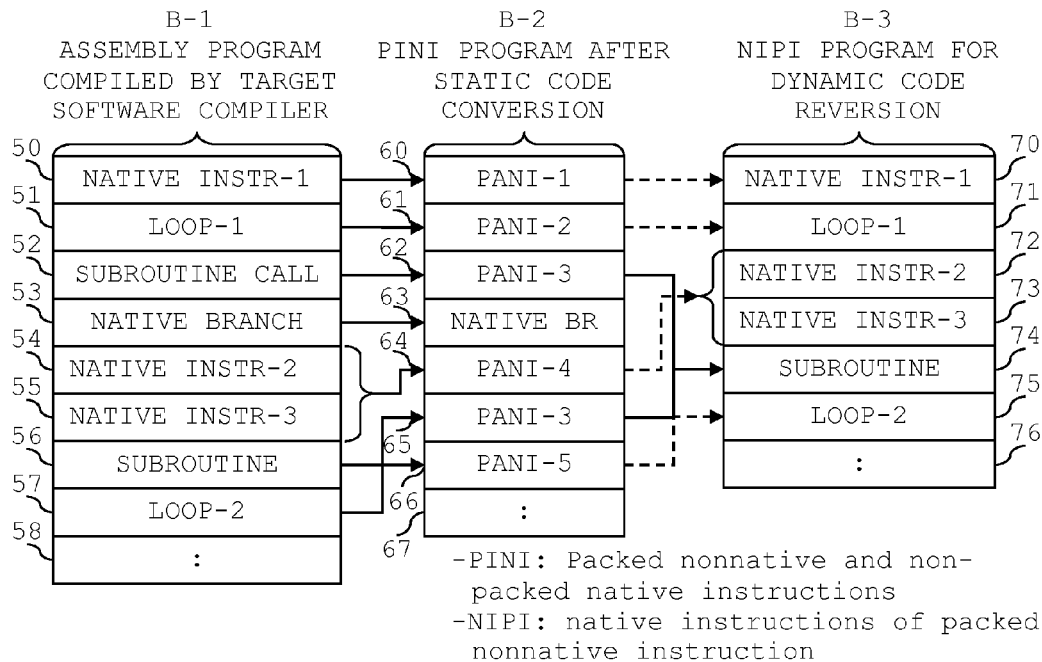
FIG. 3 is a diagram showing one embodiment of a native instruction conversion and reversion procedure and the converted code allocation procedure of the invented two types of code, PINIs and NIPIs, for a single or plurality of memory banks in the adaptive instruction memory system where different types of the PINIs consisting of a non-packed branch instruction and the PANI of a couple of loops, a subroutine caller and the associative subroutine, and a couple of the consecutive native instructions are stored, prefetched and fetched to a microprocessor.
Figure 3:
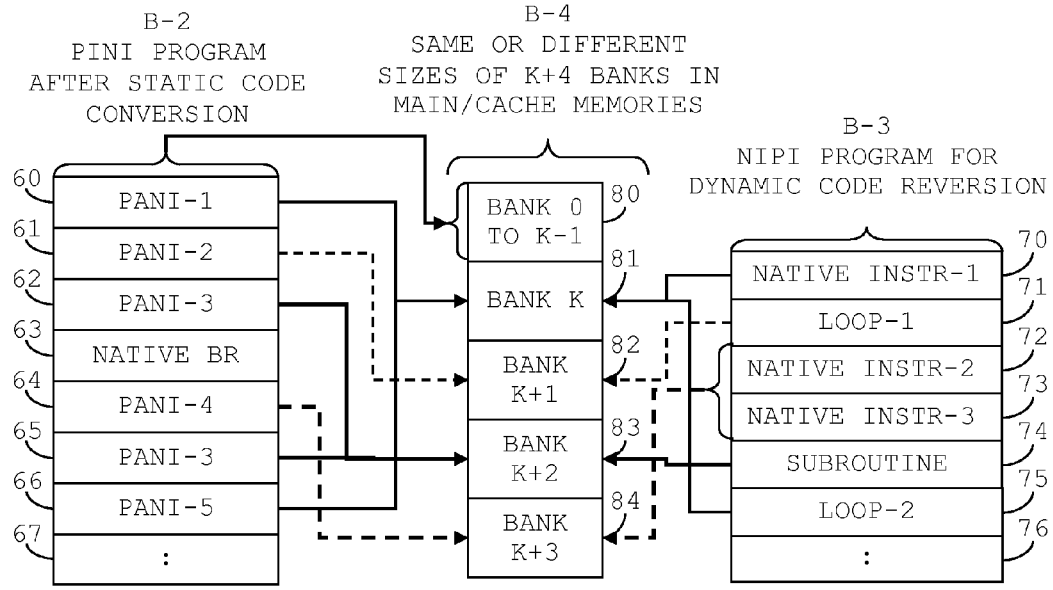

FIG. 3 shows one embodiment of a native instruction conversion and reversion procedure A-1 and the allocation procedure of the PANIs 43 and the non-packed native instructions 44 of the PINIs 41 for a single or plurality of banks in the AIM system A-3.

The static code conversion of the native instructions in a program 40 to the PINIs 41 produces PANIs 43 and non-packed native instructions 44. It also produces the NIPIs 42 and associated information as the NIPIs 42. A single or plurality of consecutive native instructions in the assembly program generated by the target software compiler is converted to a PINI 41 by the static code conversion system 31 during the post software compilation time. Alternatively, the static code conversion system 31 directly generates the PINI 41 and the NIPIs 42 from the high-level language program by integrating the conversion procedure to the software compilation in prior arts.

The native instruction segments of basic blocks, loops, subroutines, subroutine calls, and parts of those native instruction segments are encapsulated as the PANIs 43. Branch instructions that are not included in the PANIs 43 remain as non-packed native instructions 44. The native instructions at the branch target locations can be encapsulated in the PANIs 43 if the native instructions at the branch target locations are the first instructions of the PANIs 43. Otherwise, the native instructions at the branch target locations must not be encapsulated into any PANIs 43.

The subroutine call instructions are converted to the PANIs 43. This conversion results in inline expansion without duplicating the body of the associated subroutines. The subroutines themselves are also packed in the same way as the PANIs 43 of the associative subroutine call instructions. Single level or multi-level loops are encapsulated as the PANIs 43.

The PINIs 41 are reverted during the instruction prefetching and/or fetching time dynamically. The reverted instructions of the PINIs 41 are NIPIs 42 and non-packed native instructions 44 that can be executable to the target microprocessor. The reversion of the subroutine call instructions from the associative PANIs 43 can be done by forwarding the NIPIs of the associative PANIs 43. During this reversion process, both the subroutine call instruction as a PANI 43 and the subroutine return instruction in the associative subroutine can be removed. Therefore, the microprocessor 98 does not fetch the subroutine call and return instructions for execution.

The PINI 41 is converted from native instruction segments in the program 40 to the mix of the PANIs 43 and non-packed native instructions 44. A non-packed native instruction 44 is a native instruction that is not packed with any other native and/or PANI 43. The PINI 41 is adaptively scaled as limited amounts of non-packed native instructions 44 and/or PANIs 43. A plurality of instructions, including branches, can be packed and converted as adaptively scaled PANIs 43.

The instructions of the PINI 41 can be stored in the dedicated, separate regions of distinct addresses in the instruction cache and/or main memories 108. The PINI 41 is stored into the sequential and/or concurrent accessible cache and main memories 108. The PANIs 43 and non-packed native instructions 44 of the PINI 41 are prefetched and/or fetched via the separate paths from the sequential and/or concurrent accessible cache and main memories 108.

Non-packed native instructions 44 stored in the sequential and/or concurrent accessible cache and main memories 109 are directly prefetched and/or fetched while the PANI 43 is prefetched and/or fetched after having been dynamically reverted by accessing the associated NIPIs 42 stored in the sequential and/or concurrent accessible cache and main memories 109. The PINIs 41 from the next prospective locations such as the next instruction of the flow control instruction and the instruction at the branch target location are prefetched and/or fetched whenever accessing a flow control instruction such as a conditional branch instruction.

A PANI 43 represents a segment of the native instructions appearing in the program 40. A PANI 43 contains a single or plurality of native and/or PANIs 43 in a single instruction form. A PANI 43 comprises the branch instructions with non-branch instructions, all of the instructions in a loop or a subroutine, or all of the non-branch or branch target instructions. A PANI 43 is comprised of multiple non-packed native instructions 44 and/or PANIs 43.

The PANIs 43 are composed by packing segments of native instructions in basic blocks, loops, subroutines, and parts of the sequential instructions in any non-fractional parts of the program, and by assigning segments of the native instructions to individually PANIs 43. A non-fractional part of the program must contain a segment of a single or plurality of consecutive native instructions including only non-branch and non-branch target instructions. The PANIs 43 contain associative opcodes and/or other information, such as start and/or end locations of the native instruction segments of the PANIs 43, the number of instructions packed in each PANI 43, and so on, for the AIM system A-3 to distinguish PANIs 43 from a PINI 41 as well as to identify the native flow control instructions, such as branch instructions.

Each PANI 43 comprises an opcode and an information field containing location information of the first native instruction of the segment of the PANI 43. In particular, all of the PANIs 43 can have the same opcode or different opcodes. However, the opcode used for the PANIs 43 must not be used for the native instructions. In order to identify how many native instructions are encapsulated in the PANI 43, the PANI 43 can have an additional field for this purpose. As an alternative approach, each native instruction encapsulated in the PANI 43 has an associative bit stored in the dedicated main instruction memory for identification of the last native instruction in the PANI 43. The last native instruction in each PANI 43 must have a different bit value from the bit value of the other native instructions packed in the same PANI 43.

The NIPI 42 includes the native instructions and associated information of the PANI. The NIPI 42 is stored in the sequential and/or concurrent accessible cache and main memories 109. The NIPI 42 is prefetched and/or fetched whenever the instruction detectors 110 distinguish between mixed PANIs 43 and non-packed native instructions 44 in the received PINIs 41. The NIPI 42 is prefetched and/or fetched by obtaining the first native instruction of each PANI 43 from the instruction detectors 110. The remaining NIPI 42 continue to be prefetched and/or fetched from the addresses updated through the address generators 103. Prefetching of the NIPIs 42 is terminated when the instruction detectors 110 detect the last native instruction of each NIPI 42.

The PINIs 41 and NIPIs 42 are separately allocated to the different locations of the same or different sequential and/or concurrent accessible cache and main memories 108, 109. The employed single or plurality of levels of the cache memories in the sequential and/or concurrent accessible cache and main memories 108, 109 have the same or different sizes of the same or different number of banks that can be concurrently accessed if necessary. Multi-port cache and main memories (i.e., dual-port RAM) can also be used for allocating the PINIs 41 and NIPIs 42.

In order to prefetch and/or fetch NIPIs concurrently, the NIPIs 42 are allocated to the different banks in the sequential and/or concurrent accessible cache and main memories 109. In particular, the PANI 43 located right after a flow control instruction such as a branch instruction in the program must not be stored to the same bank where the NIPI of the associated PANI 43 is located at the branch target location of the branch instruction for the concurrent prefetch and/or fetch. The NIPIs 42 are stored to the different banks of the main instruction memory 94 in the circular manner without violating the aforementioned allocation rules of the NIPIs 42.

The native instruction conversion and reversion procedure A-1 shows the procedure for classifying and converting the native instructions in the assembly program B-1, which is an example of the native instructions in program 40, to the PINIs 41 in the PINI program B-2 by packing a single or plurality of the consecutive native instructions that represent a basic block, a loop, a subroutine, a subroutine caller, or a part of the loop or subroutine. The native instruction conversion and reversion procedure A-1 also shows the procedure for dynamically reverting the PINIs 41 to the reverted NIPIs 42 in the NIPI program B-3 during the instruction prefetch and/or fetch operation at runtime. The PINIs 41 in the PINI program B-2 converted from the assembly program B-1 are stored in the main instruction memory banks (PINI-MEM) 91. The NIPI program B-3 is stored in the main instruction memory banks (NIPI-MEM) 94.

A sequence of the native instructions from 50 to 58 is illustrated as an assembly program B-1 compiled by the target software compiler. The native instruction-1 50 is identified as a non-branch and non-branch target native instruction, which is not a part of the loop-1 51 either. This native instruction-1 50 is packed as the PANI-1 60 in the PINI program B-2. The PANI-1 60 in the PINI B-2 is reverted as the NIPI-1 70 in the NIPI program B-3 during the instruction prefetching and/or fetching operation at runtime. The native instruction-1 50 and the NIPI-1 70 can be the same instruction.

The loop-1 51 represents a group of the native instructions performing a loop operation. The native instructions in the loop-1 51 are packed as the PANI-2 61 in the PINI program B-2. The PANI-2 61 is reverted as the loop-1 71 in the NIPI program B-3 during the instruction prefetching and/or fetching operation at runtime. The native instructions in the loop-1 51 and the native instructions in the loop-1 71 can be the same instructions.

The subroutine call instruction 52 is a native instruction for calling the native instructions used for the subroutine 56. The subroutine call instruction 52 is packed as the PANI-3 62 in the PINI program B-2. The PANI-3 62 in the PINI program B-2 is reverted as the subroutine 74 in the NIPI program B-3 during the instruction prefetching and/or fetching operation at runtime. This conversion and reversion procedure A-1 of the subroutine call instruction 52 performs an inline expansion that does not duplicate the body of the subroutine to the program unlike in prior arts. The native instructions used in the subroutine 74 in the NIPI program B-3 during the instruction prefetching and/or fetching operation at runtime are prefetched and/or fetched and delivered to the microprocessor 98. Consequently, up to two branch operations including a subroutine call operation and a subroutine return operation disappear. Similarly, all of the other subroutine call instructions used in the same subroutine 56 in the assembly program B-1 share the same native instructions reverted in the subroutine 74 by simply accessing the same locations of the native instructions used for the subroutine 74 in the NIPI program B-3 during the instruction prefetching and/or fetching operation at runtime.

The native instruction 53 is a branch instruction that is not qualified for instruction packing. The native instruction 53 in the assembly program B-1 is the same native branch instruction 63 in the PINI program B-2. Any reversion operation of the native branch instruction 63 in the PINI program B-2 is not required. The non-packed native branch instruction 63 in the PINI program B-2 is prefetched and/or fetched to the microprocessor 98.

The next native instructions 54 and 55 in the assembly program B-1 are not classified as branch or branch target instructions, instructions of a loop or a subroutine, or subroutine callers either. These native instructions 54 and 55 are packed as the PANI-4 64 in the PINI program B-2. The PANI-4 64 is reverted as the native instruction-2 72 and the native instruction-3 73 in the NIPI program B-3 during the instruction prefetching and/or fetching operation at runtime. The native instruction-2 54 and the native instruction-3 55 respectively can be the same as the native instruction-2 72 and the native instruction-3 73.

The subroutine 16 containing a single or plurality of native instructions in the assembly program B-1 is packed as the PANI-3 65 in the PINI program B-2. The PANI-3 65 is reverted as the subroutine 74 in the NIPI program B-3. The native instructions used in the subroutine 56 can be the same native instructions in the subroutine 74. However, the subroutine return instruction in the subroutine 74 can be removed for a similar or the same effect of the inline expansion aforementioned.

Similarly, the loop-2 57 represents a group of the native instructions performing a loop operation. The native instructions in the loop-2 57 are packed as the PANI-5 66 in the PINI program B-2. The PANI-5 66 is reverted as the loop-2 75 in the NIPI program B-3 during the instruction prefetching and/or fetching operation at runtime. The native instructions in the loop-2 57 and the native instructions in the loop-2 75 can be the same instructions.

The PINIs in the PINI program B-2 and the native instruction sequences of the NIPIs in the NIPI program B-3 are separately stored to the different banks in the main instruction memories 91, 94. The allocation procedure A-2 of the PINIs and the NIPIs for the single or plurality of banks in the main instruction memory C-1-1 illustrates the procedure for allocating the PINIs in the PINI program B-2 to the k number of the banks in the main and cache memories B-4 and for allocating the reverted NIPIs in the NIPI program B-3 to the same or different sizes of the banks in the main and cache memories B-4. Native instructions from 70 to 76 in the NIPI program B-3 of the PINIs from 60 to 67 in the PINI program B-2 are allocated to the k number of the banks from the bank 0 to the bank k−1 where k is a reasonable positive integer number.

The NIPIs in the NIPI program B-3 are allocated to the different banks in the main instruction memory 94 for a concurrent and/or pipelined single or plurality of accesses of the NIPIs. In order to prefetch and/or fetch a single or plurality of NIPIs in the NIPI program B-3 in concurrent and pipelined manners, the sequences of the NIPIs in the NIPI program B-3 are allocated to the different banks in the main memories 94 shown in the banks in the main and cache memories B-4, which is an example of the single or plurality of main instruction memory banks 94 for the NIPIs 42 of the PANIs 43.

The reverted native instruction-1 70 in the NIPI program B-3 of the PANI-1 60 is allocated to the bank k 81. The reverted native instructions in the loop-1 71 in the NIPI program B-3 of the PANI-2 61 are allocated to the bank k+1 82. The reverted native instructions in the subroutine 74 in the NIPI program B-3 of the PANI-3 62 and the PANI-3 65 are allocated to the bank k+2 83 although the native instructions of the subroutine call 52 and the subroutine 56 in the assembly program B-1 are different. However those instructions 52 and 56 perform the same operation in the invention. The reverted native instruction-2 72 and the reverted native instruction-3 73 in the NIPI program B-3 of the PANI-4 64 are allocated to the bank k+3 84. The reverted native instructions in the loop-2 75 in the NIPI program B-3 of the PANI-5 66 are allocated to the bank k 81 for enhancing the concurrent native instruction accesses of the single or plurality of PANIs. Although the allocation procedure for the k+4 memory scheme is shown in FIG. 3, a plurality of the same or different sizes of memory and cache banks can be used for the invented AIM system A-3.

Figure 4:
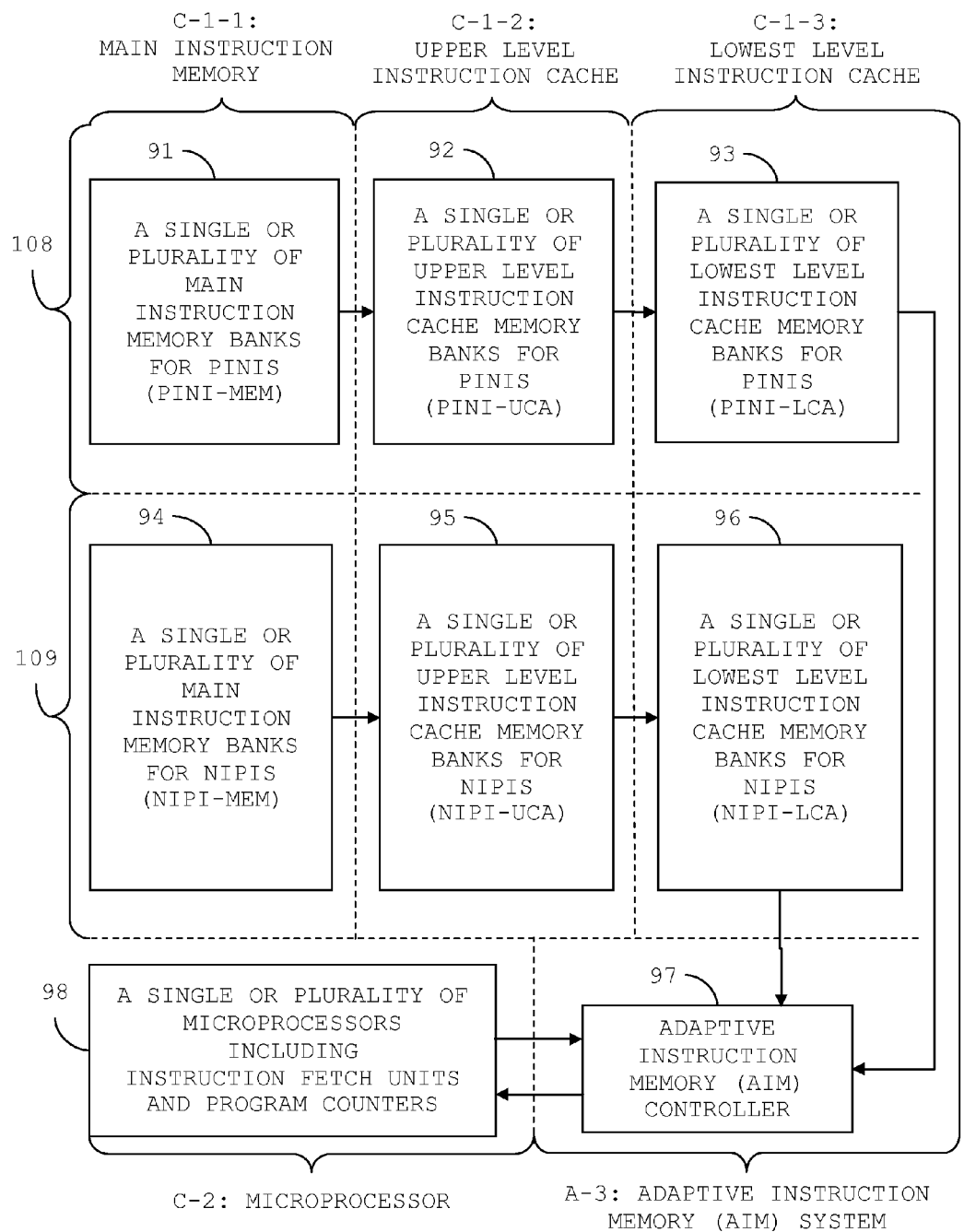
FIG. 4 is a diagram showing one embodiment of a dynamic code reversion system including the adaptive instruction memory system and a microprocessor.

FIG. 4 is one embodiment of an adaptive prefetching and fetching system of PINIs 41 from the AIM system A-3 to a single or a plurality of microprocessors 98. Similar to a conventional microprocessor system, instruction memory generally consists of the large and slow main instruction memory (i.e., ROM) and small and fast cache memories (i.e., SRAM). Smaller and faster cache memories are located between the main instruction memory and the microprocessor. Another hardware component, the adaptive instruction memory controller 97, is located in front of the microprocessor. A conventional microprocessor typically consists of an instruction fetch unit and datapaths. The instruction fetch unit in the microprocessor includes a program counter in order to fetch a single or plurality of instructions.

The PINIs 41 can be stored in the different locations of the same instruction memory bank or in the separate memory banks. The PINIs 41 are stored into the PINI-MEM 91. The PINIs 41 are prefetched and/or fetched via the different paths from the paths of the NIPIs 42. When accessed from the single or plurality of PINI-MEM 91, PINIs currently being accessed are temporarily stored in a single or plurality of upper level instruction cache memory banks for PINIs (PINI-UCA) 92. Similarly, PINIs currently being accessed are temporarily stored in a single or plurality of lower level instruction cache memory banks for PINIs (PINI-LCA) 93 whenever accessed from the PINI-UCA 92. The PINI-MEM 91, PINI-UCA 92, and PINI-LCA 93 are consisted in a single or plurality of PINI main and cache memories 108. Additional levels of the PINI cache memories may be used if necessary.

In one embodiment, the main instruction memory C-1-1 consisting of the PINI-MEM 91 and NIPI-MEM 94 holds different binary forms of instructions and information as PINIs 41, such as non-packed native instructions 44 and PINIs 43, and NIPIs 42. The PINIs 41 can be stored in the different locations of the same single or separate plurality of memory banks in the PINI-MEM 91. Similarly, the NIPI-MEM 94 hold the NIPIs 42.

The main instruction memory C-1-1 is accessed whenever the upper level instruction cache C-1-2 consisting of the PINI-UCA 92 and a single or plurality of upper level instruction cache memory banks (NIPI-UCA) 95 does not contain the associative PINIs 41 and NIPIs 42 requested by the microprocessor C-2. In particular, the PINIs 41 stored in the PINI-MEM 91 are prefetched and/or fetched to the PINI-LCA 93 via the PINI-UCA 92. Similarly, the NIPIs 42 stored in the NIPI-MEM 94 are prefetched and/or fetched to a single or plurality of lower level instruction cache memory banks (NIPI-LCA) 96 for the NIPIs 42 via the NIPI-UCA 95. The lowest level instruction cache C-1-3 consists of the PINI-LCA 93 and NIPI-LCA 96.

The PINI-MEM 91 hold the PINIs in the single or plurality of memory banks. The PINI-MEM 91 respond to the single or plurality of prefetch and/or fetch requests from the PINI-LCA 93 via the PINI-UCA 92 by forwarding the single or plurality of PINIs to the PINI-UCA 92.

The NIPI-MEM 94 hold the NIPIs in the single or plurality of memory banks. The PINI-MEM 91 respond to the single or plurality of prefetch and/or fetch requests from the NIPI-LCA 96 via the NIPI-UCA 95 by forwarding the single or plurality of the NIPIs 41 to the NIPI-UCA 95.

In one embodiment, the upper level instruction cache C-1-2 generally consists of a single or plurality of cache memory banks for the PINIs 41 and the NIPIs 42. The upper level instruction cache C-1-2 accesses the main instruction memory C-1-1 whenever any accessed instruction is not found in the upper level instruction cache C-1-2.

The PINI-UCA 92 temporarily store the PINIs 41 prefetched and/or fetched from the PINI-MEM 91. The PINI-UCA 92 generate a single or plurality of cache hit/miss signals and send the signals to the PINI-LCA 93. The PINI-UCA 92 also pass a single or plurality of addresses received from the PINI-LCA 93 if generating the cache miss signals.

The NIPI-UCA 95 temporarily store the NIPIs 42 prefetched and/or fetched from the NIPI-MEM 94. The NIPI-UCA 95 generate a single or plurality of cache hit/miss signals and send the signals to the NIPI-LCA 96. The NIPI-UCA 95 also pass a single or plurality of addresses received from the NIPI-LCA 96 if generating the cache miss signals.

In one embodiment, the lowest level instruction cache C-1-3 generally consists of a single or plurality of cache memory banks for the PINIs 41 and NIPIs 42. The lowest level instruction cache C-1-3 accesses the PINI-UCA 92 whenever any accessed instruction is not found in the lowest level instruction cache C-1-3.

The PINI-LCA 93 temporarily store the PINIs 41 prefetched and/or fetched from the PINI-UCA 92. The NIPI-LCA 96 temporarily store the NIPIs 42 prefetched and/or fetched from the NIPI-UCA 95. The PINI-LCA 93 generate a single or plurality of cache hit/miss signals and send the signals to the PINI identifier and prefetch unit (PINI-IDU) 97-c. The PINI-LCA 93 also pass a single or plurality of addresses received from the PINI-UCA 92 if generating the cache miss signals.

The NIPI-LCA 96 temporarily store the NIPIs fetched and/or prefetched from the NIPI-UCA 95. The NIPI-LCA 96 generate a single or plurality of cache hit/miss signals and send the signals to the PINI-IDU 97-c. The NIPI-LCA 96 also pass a single or plurality of addresses received from the NIPI-UCA 95 if generating the cache miss signals. The NIPI-LCA 96 also send the information of the last native instruction of the NIPI fetched to the PINI-IDU 97-c for terminating the current native instruction prefetching and/or fetching operation of the PANI 43 in the PINI 41.

Non-packed native instructions 44 are directly fetched while the PANI 43 is fetched after having been dynamically reverted by accessing the associated NIPIs 42 stored in a single or plurality of banks. The PINIs from the next prospective locations such as the next instruction of the flow control instruction and the instruction at the branch target location are prefetched whenever prefetching and/or fetching a flow control instruction such as a branch instruction. The PANIs from the PINIs prefetch and/or fetch the NIPIs from the different banks of the hierarchical instruction cache and/or the main memories in concurrent and/or pipelined manners.

The main instruction memory C-1-1 is accessed whenever the upper level instruction cache C-1-2 does not contain the associative PINIs 41 requested by the microprocessor C-2. Similarly, the upper level instruction cache C-1-2 is accessed whenever the lowest level instruction cache C-1-3 does not contain the associative PINIs requested by the microprocessor C-2. When accessed from the single or plurality of the PINI-MEM 91, PINIs 41 currently being accessed are temporarily stored in the PINI-UCA 92. Similarly, PINIs 41 currently being accessed are temporarily stored in the PINI-LCA 93 whenever accessed from the PINI-UCA 92. The upper and lowest level PINI cache memories C-1-2 and C-1-3 respectively are able to hold at least one bundle of PINIs 41. The PINIs in a bundle are the PINI currently being used, the consecutive PINI of the current one, and/or the PINI at the branch target location if needed. In general, one or more bundles of these PINIs can be temporarily stored in and removed from the upper and lowest level PINI cache memories C-1-2 and C-1-3 by replacement policies used in prior arts. The upper and lowest level PINI cache memories C-1-2 and C-1-3 respectively are organized with a single or plurality of banks for a single or plurality of simultaneous accesses if necessary.

The organizations of the NIPI-MEM 94, the NIPI-UCA 95, and the NIPI-LCA 96 for the NIPIs 42 are used for accessing reverted native instructions of the packed instructions. The associative information includes start and/or end locations of the native instruction sequences of the packed instructions, a plurality of instructions packed in each packed instruction, and/or other information related to reverting the native instruction sequences of the packed instructions. Each packed instruction stored in the PINI-MEM 91, the PINI-UCA 92, and the PINI-LCA 93 has the associative copies of the native instruction sequence and associative information of the packed instruction 42 in the NIPI-MEM 94, and the NIPI-UCA 95, and the NIPI-LCA 96, respectively.

In one embodiment, the adaptive instruction memory (AIM) controller 97 receives the instruction fetching request from the program counter in the instruction fetch unit in the microprocessor 98 and delivers the requested native instruction fetched from one of the PINI-LCA 93 to the microprocessor 98. The AIM controller 97 identifies the PANIs received from the PINI-LCA 93.

The AIM controller 97 also receives cache hit/miss signals from the PINI-LCA 93. A signal indicating the last native instruction of the PANI is also forwarded to the AIM controller 97 for terminating the prefetching or fetching operation of the PINI. The AIM controller 97 also identifies any new prefetching operations by checking and recording the availability of the prefetch program counters of the PINIs and of the prefetch program counters of the NIPIs. Any new prefetching operations are prevented if a prefetch program counter is not available. The AIM controller 97 also identifies non-packed branch instructions for prefetching PINIs from the prospective locations of the identified branch instruction. The AIM controller 97 also generates and passes a switching signal for delivering native instructions from either the PINI-LCA 93 or the NIPI-LCA 96 to the microprocessor 98.

The AIM controller 97 employs a single or plurality of program counters for prefetching and fetching the PINIs 41 and the NIPIs 42 in concurrent and/or pipelined manners. In addition, the single or plurality of program counters in the AIM controller 97 point to a single or plurality of locations of the sequences of the PINI 41 and the NIPIs 42 while the value of the program counter employed in the microprocessor 98 continues to be increased until a new program counter value is obtained by taking branch to non-consecutive program location.

The AIM controller 97 synchronizes the program counter values used itself with the new program counter value of the microprocessor 98 and resumes fetching PINIs from the new location. The AIM controller 97 is also capable of synchronizing the program counter value of the loop packed as a PANI with the new program counter value of the microprocessor 98 for branching to the location in the loop.

Other hardware components typically used in prior arts including branch prediction logic hardware, instruction prefetch unit and queues, and others can be included in the microprocessor 98 if needed. A single or plurality of microprocessors C-2 integrates to the AIM system A-3.

Figure 5:
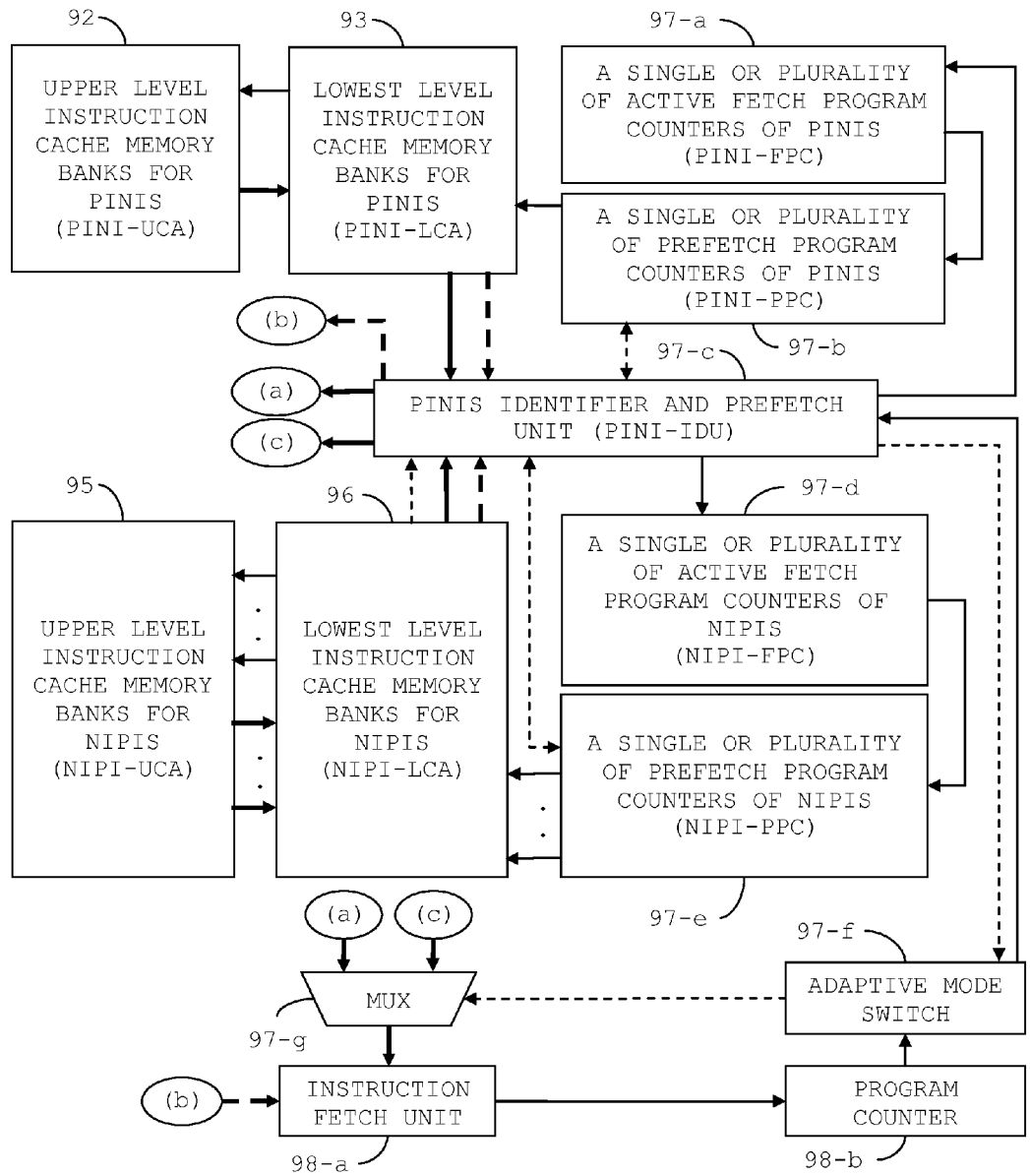
FIG. 5 is a diagram showing one embodiment of an organization and a series of actions of the dynamic code reversion system that may be performed by the several components, which include a PINI identifier and prefetch unit, and a single or plurality of fetch and prefetch program counts of the PINIs and NIPIs.

FIG. 5 is one embodiment of an organization and a series of actions of the dynamic code reversion system 32 that may be performed by the several components in the AIM controller 97 of FIG. 4.

The AIM controller 97 consists of the single or plurality of active fetch program counters (PINI-FPC) 97-a of the PINIs 41, the single or plurality of prefetch program counters (PINI-PPC) 97-b of the PINIs 41, the PINI identifier and prefetch unit (PINI-IDU) 97-c, the single or plurality of active fetch program counters (NIPI-FPC) 97-d of the NIPIs 42, the single or plurality of prefetch program counters (NIPI-PPC) 97-e of the NIPIs 42, the adaptive mode switch 97-f, and the multiplexer 97-g.

The AIM controller 97 achieves the same or a similar effect of pipelined and/or concurrent instruction prefetching and fetching of a single or plurality of instructions. The AIM controller 97 adaptively prefetches and/or fetches a single or plurality of PINIs 41 and NIPIs 42 in concurrent and/or pipelined manners while delivering fetched a single or plurality of native instructions to the single or plurality of microprocessors C-2 in their programming order.

More specifically, the AIM controller 97 receives the single or plurality of the instruction fetching requests from the single or plurality of the program counters 98-b in the single or plurality of the instruction fetch units 98-a in the single or plurality of microprocessors 98 and delivers the single or plurality of requested native instructions fetched from a single or plurality of the PINI-LCA 93 or the NIPI-LCA 96 to the single or plurality of microprocessors 98.

After receiving a single or plurality of fetch requests or addresses from the single or plurality of microprocessors 98, the AIM controller 97 evaluates the received addresses with the addresses stored in the single or plurality of the active PINI-FPC 97-a. The AIM controller 97 produces a single or plurality of the adjusted prefetch and fetch program counter values when detecting a branch miss prediction. If the evaluation result indicates a branch miss prediction, the AIM controller 97 updates a single or plurality of the adjusted prefetch and fetch program counter values to the single or plurality of the active PINI-PPC 97-b and/or PINI-FPC 97-a. Otherwise, the AIM controller 97 initiates a single of plurality of the PINI prefetch and/or fetch operations.

The AIM controller 97 prefetches and/or fetches a single or plurality of the PINIs 41 from the single or plurality of locations of the PINI-MEM 91 via a single or plurality of levels of PINI-UCA 92 and PINI-LCA 93 by passing a single or plurality of addresses stored in the single or plurality of PINI-PPC 97-b and PINI-FPC 97-a.

The AIM controller 97 identifies the PANIs 43 and non-packed native instructions 44 in the prefetched and/or fetched PINIs 41. More specifically, the AIM controller 97 is to distinguish PANIs 43 from PINIs 41 as well as to identify the non-packed native flow control instructions, such as branch instructions. If a PANI 43 is identified, the AIM controller 97 produces a single or plurality of addresses for prefetching and/or fetching the single or plurality of the NIPIs 42 of the identified PANI 43. The obtained NIPI prefetch and/or fetch addresses are stored to the single or plurality of the active NIPI-PPC 97-e and/or NIPI-FPC 97-d in order to access the native instruction of the NIPIs 42. Otherwise, the AIM controller 97 directly forwards the fetched non-packed native instructions 44 to the single or plurality of microprocessors C-2 as well as updates the prefetched non-packed native instructions 44 to a single or plurality of levels of PINI-UCA 92 and/or PINI-LCA 93.

The AIM controller 97 initiates the prefetch and/or fetch of the single or plurality of the NIPIs 42 of the identified PANI 43 from the associative locations of the NIPI-MEM 94 via a single or plurality of levels of the NIPI-UCA 95 and NIPI-LCA 96 by passing a single or plurality of addresses stored in the single or plurality of the NIPI-PPC 97-e and NIPI-FPC 97-d.

The AIM controller 97 receives and generates a plurality of control signals from and to external and internal components. More specifically, the AIM controller 97 receives cache hit/miss signals from the PINI-LCA 93. A signal indicating the last native instruction of the NIPI is also forwarded to the AIM controller 97 for terminating the prefetching and/or fetching operations of the NIPI 42. The AIM controller 97 also identifies any new prefetching and/or fetching operations by checking and recording the availability of the PINI-PPC 97-b and/or NIPI-PPC 97-e. Any new prefetching operation is prevented if a PINI-PPC 97-b or NIPI-PPC 97-e is not available. The AIM controller 97 also identifies non-packed branch instructions 44 for prefetching PINIs 41 from the prospective locations of the identified branch instruction. The AIM controller 97 generates and passes a switching signal for delivering native instructions from either the PINI-LCA 93 or the NIPI-LCA 96 to the microprocessor 98.

The AIM controller 97 employs a single or plurality of program counters, PINI-FPC 97-a, PINI-PPC 97-b, NIPI-FPC 97-d, NIPI-PPC 97-e. The PINI-FPC 97-a and PINI-PPC 97-b are used as a single or plurality of the PINI program counters (PINI-PC) 107 in FIG. 6. The NIPI-FPC 97-d and NIPI-PPC 97-e are used as a single or plurality of the NIPI program counters (NIPI-PC) 105 and the NIPI program offsets (NIPI-PO) 104 in FIG. 6. In addition, the single or plurality of program counters in the AIM controller 97 point to a single or plurality of locations of the PINIs 41 and NIPIs 42 while the value of the program counter employed in the microprocessor 98 continues to be increased until a new program counter value is updated whenever a flow control instruction takes branch. The AIM controller 97 synchronizes the program counter values used itself with the new program counter value of the microprocessor 98 and resumes fetching PINIs 41 from the new location. The AIM controller 97 is also capable of synchronizing the program counter value of the loop packed as a PANI 43 with the new program counter value of the microprocessor 98 for branching to the location in the loop.

The components inside of the AIM controller 97 are interconnected to each other, to the components, such as the program counter 98-b and the instruction fetch unit 98-a, of the microprocessor 98, and also to the components, such as the PINI-LCA 93 and the NIPI-LCA 96, of the instruction cache memories C-1-2 and C-1-3. In order to swiftly deliver the PINIs 41 and/or NIPIs 42 missed from the cache memories, the PINIs 41 and/or NIPIs 42 accessed from the PINI-MEM 91 and/or the NIPI-MEM 94 can be directly forwarded to the AIM controller 97 while writing the PINIs 41 and/or NIPIs 42 accessed to the cache memories.

Figure 6:
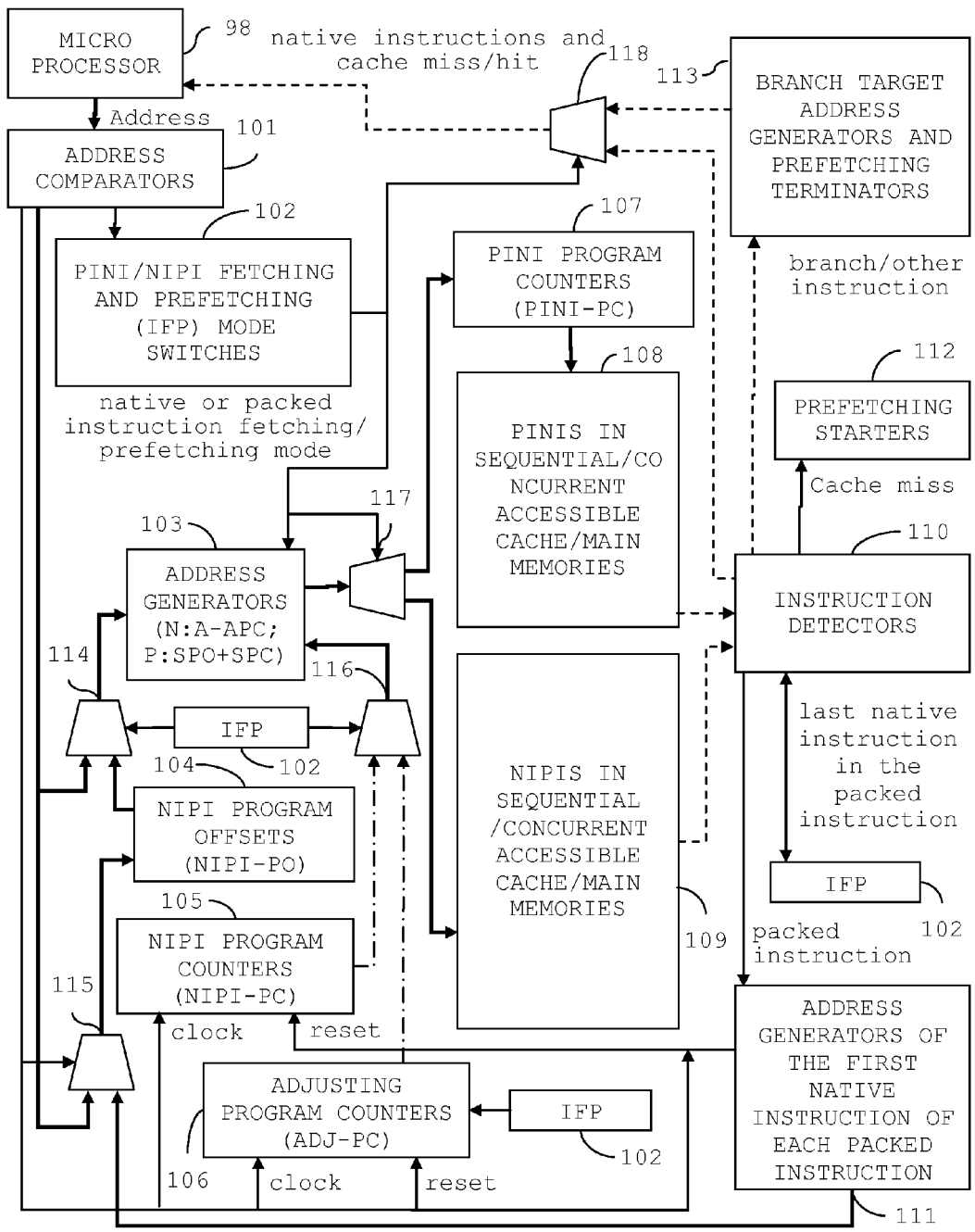
FIG. 6 is a diagram showing one embodiment of a microprocessor system including the adaptive instruction memory system that consists of the PINI program counters, NIPI program offsets, NIPI program counters, adjusting program counters, address comparators, instruction fetching mode and prefetching mode switches, and address generators for performing a single or plurality of concurrent instruction prefetching and fetching operations.

The AIM controller 97 receives an instruction fetch request from the instruction fetch unit 98-a via the adaptive mode switch 97-f consisting of an address comparator 101 and a single or plurality of instruction fetching and prefetching (IFP) mode switches 102 in FIG. 6. The AIM controller 97 transmits a single or plurality of native instructions via the multiplexer 97-g after receiving the request from the instruction fetch unit 98-a.

In one embodiment, the PINI-FPC 97-*a* receive the instruction fetch address from the adaptive mode switch 97-*f* via the PINI-IDU 97-*c* if the PINI fetching mode is set. The PINI-FPC 97-*a* is used for fetching the PINIs 41 from the already prefetched PINIs 41 according to the programming order of the native instructions passed from the microprocessor 98 by synchronizing with the new program counter value during the PINI fetching mode. The PINI-FPC 97-*a* forward the copies of the stored instruction fetching addresses to the PINI-PPC 97-*b*. The PINI-FPC 97-*a* update the associated single or plurality of active fetch program counter values for fetching the next single or plurality of PINIs whenever receiving the instruction fetch request from the microprocessor 98.

In one embodiment, the PINI-PPC 97-*b* receives the copies of the stored instruction fetching addresses from the PINI-FPC 97-*a* whenever new program counter value is stored to PINI-FPC 97-*a*. The PINI-PPC 97-*b* stores the received instruction fetching address to one of the available prefetch program counters. The PINI-PPC 97-*b* asserts a single or plurality of instruction prefetching addresses to the PINI-LCA 93.

In one embodiment, the PINI-IDU 97-*c* receives the address of the instruction fetch from the adaptive mode switch 97-*f*. The PINI-IDU 97-*c* forwards a mode switching signal to the adaptive mode switch 97-*f*. The PINI-IDU 97-*c* passes the native instructions from the PINI-LCA 93 to the multiplexer 97-*g* after identifying the non-packed native instructions 44. The PINI-IDU 97-*c* transmits an instruction fetching mode switching signal to the adaptive mode switch 97-*f* that transmits a control signal to the multiplexer 97-*g* for delivering the single or plurality of native instructions fetched from the PINI-LCA 93 or from the NIPI-LCA 96 to the instruction fetch unit 98-*a*, if the native instruction fetching mode is set. The PINI-IDU 97-*c* forwards the received instruction fetch address from the adaptive mode switch 97-*f* to the PINI-FPC 97-*a* if the PINI fetching mode is set.

The PINI-IDU 97-*c* receives the single or plurality of PINIs 41 and a cache hit or miss signal from the PINI-LCA 93. Upon receiving the cache hit signal, the PINI-IDU 97-*c* evaluates and identifies each PINI received and forwards only the non-packed native instruction 44, such as conditional branch instruction, to the port (a) of the multiplexer 97-*g*. Otherwise, the PINI-IDU 97-*c* postpones the aforementioned identification operation until it receives the cache hit signal. The PINI-IDU 97-*c* forwards a single or plurality of instruction fetching addresses of the NIPIs 42 to the NIPI-FPC 97-*d*. The single or plurality of instruction fetching addresses of the NIPIs 42 are obtained from the PANIs 43 identified by extracting the starting address fields from the identified PANIs 43 by the PINI-IDU 97-*c*.

The PINI-IDU 97-*c* receives the single or plurality of native instructions accessed from the addresses received from the NIPI-PPC 97-*e* in the NIPI-LCA 96 and forwards the native instructions of the NIPIs 42 to the port (c) of the multiplexer 97-*g* if those native instructions are stored in the NIPI-LCA 96. The PINI-IDU 97-*c* also receives a cache hit signal from the NIPI-LCA 96 if any native instruction accessed is found in the NIPI-LCA 96. Otherwise, the PINI-IDU 97-*c* permits forwarding the same single or plurality of prefetch addresses received from the NIPI-PPC 97-*e* to the NIPI-UCA 95 for accessing the single or plurality of NIPIs 42.

The prefetched single or plurality of NIPIs 42 are stored to the NIPI-LCA 96 via the NIPI-UCA 95 while one or multiple prefetched native instructions are directly forwarded to the port (c) of the multiplexer 97-*g* via the PINI-IDU 97-*c*. The associative information of the single or plurality of prefetched native instructions and a cache hit signal are forwarded to the PINI-IDU 97-*c*. The PINI-IDU 97-*c* evaluates the prefetched associative information of the NIPIs 42 and transmits a single or plurality of prefetch termination signals to the NIPI-PPC 97-*e* if it receives the information of the last native instructions of the NIPIs 42. Then, the NIPI-PPC 97-*e* invalidates the single or plurality of associated prefetch program counters. This indicates complete prefetch cycles of the NIPIs 42. Otherwise, the NIPI-PPC 97-*e* increments the associated single or plurality of prefetch program counter values for prefetching the next single or plurality of NIPIs 42 of the same PANIs 43.

Similarly, the PINI-IDU 97-*c* terminates the single or plurality of instruction fetching operations of the NIPIs addressed by the single or plurality of active fetch program counters in the NIPI-FPC 97-*d* when identifying the information of the last native instructions of the NIPIs 42 from the NIPI-LCA 96. Then, the NIPI-FPC 97-*d* invalidates the single or plurality of associated active fetch program counters. This indicates complete fetch cycles of the NIPIs 42. The PINI-IDU 97-*c* transmits a mode switching signal to the adaptive mode switch 97-*f* for changing the current NIPI fetching mode to the PINI fetching mode. The PINI-IDU 97-*c* also transmits the cache hit signal received from either the PINI-LCA 93 or the NIPI-LCA 96 to the instruction fetch unit 98-*a* whenever transmitting fetches a single or plurality of native instructions to the instruction fetch unit 98-*a*.

In one embodiment, the NIPI-FPC 97-*d* receive a single or plurality of instruction fetching addresses of the NIPIs from the PINI-IDU 97-*c*. The single or plurality of instruction fetching addresses of the NIPIs 42 is obtained from the PANIs 43 identified by extracting the starting address fields from the identified PANIs 43.

The NIPI-FPC 97-*d* store the received single or plurality of instruction fetching addresses of the NIPIs 42 to one or multiple available fetching program counters. These stored instruction fetching addresses of the NIPIs 42 are not changed until the NIPIs 42 are completely fetched. The NIPI-FPC 97-*d* forward the single or plurality of newly stored fetch program counter values to the NIPI-PPC 97-*e*.

The NIPI-FPC 97-*d* hold addresses of the single or plurality of instruction fetching operations of the NIPIs in the single or plurality of active fetch program counters for the PINI-IDU 97-*c* to terminate the single or plurality of instruction fetching operations when the PINI-IDU 97-*c* identifies the information of the last native instructions of the NIPIs 42 from the NIPI-LCA 96. Then, the NIPI-FPC 97-*d* invalidate the single or plurality of associated active fetch program counters. This indicates complete fetch cycles of the NIPIs 42.

In one embodiment, the NIPI-PPC 97-*e* receive the single or plurality of newly stored fetch program counter values from the NIPI-FPC 97-*d* whenever new program counter value is stored to NIPI-FPC 97-*d*. The NIPI-PPC 97-*e* hold the received program counter values to a single or plurality of prefetch program counters of the NIPIs 42. The values of the single or plurality of prefetch program counters stored in the NIPI-PPC 97-*e* are forwarded to the NIPI-LCA 96.

The NIPI-PPC 97-*e* receive a single or plurality of prefetch termination signals from the PINI-IDU 97-*c* which evaluates the prefetched associative information of the NIPIs 42 if the PINI-IDU 97-*c* receives the information of the last native instructions of the NIPIs 42. Then, the NIPI-PPC 97-*e* invalidate the single or plurality of associated prefetch program counters. This indicates complete prefetch cycles of the NIPIs 42. Otherwise, the NIPI-PPC 97-*e* increment the associated single or plurality of prefetch program counter values for prefetching the next single or plurality of the same NIPIs 42.

The single or plurality of prefetching of the NIPIs 42 can be performed in concurrent and/or pipelined manners. The NIPI-PPC 97-*e* assert a single or plurality of the prefetching addresses in the single or plurality of prefetch program counters to the NIPI-LCA 96 in every cache accessing clock cycle. These concurrent and/or pipelined prefetching operations can be terminated after prefetching the NIPIs 42 located at the right after the non-packed branch instruction and at the branch target.

In one embodiment, the adaptive mode switch 97-*f* has two modes, the PINI fetching mode and the native instruction fetching mode. The adaptive mode switch 97-*f* is initialized as the PINI fetching mode. The adaptive mode switch 97-*f* receives an instruction fetching address from the program counter 98-*b*. The adaptive mode switch 97-*f* forwards the address to the PINI-IDU 97-*c*. The adaptive mode switch 97-*f* also receives a mode switching signal from the PINI-IDU 97-*c*. The adaptive mode switch 97-*f* switches the current mode to another mode whenever the mode switching signal is received.

The adaptive mode switch 97-*f* changes the instruction fetching mode from the PINI fetching mode to the native instruction fetching mode of the packed instruction or vice versa. The adaptive mode switch 97-*f* in the AIM controller receives an instruction fetch request via the program counter 98-*b* from the instruction fetch unit 98-*a*. The adaptive mode switch 97-*f* receives the value stored in the program counter 98-*b* for fetching a single or plurality of native instructions.

The adaptive mode switch 97-*f* integrated with the multiplexer 97-*g* sets a path of the native instruction fetched from the AIM system A-3 for fetching to the microprocessor. The adaptive mode switch 97-*f* transmits a control signal to the multiplexer 97-*g* for finally delivering one of the prefetched native instructions either from the bank of the PINI cache or from the bank of the NIPIs 42 to the instruction fetch unit 98-*a*.

The adaptive mode switch 97-*f* transmits a control signal to the multiplexer 97-*g* to pass the single or plurality of native instructions fetched from the PINI-LCA if the PINI fetching mode is set. Otherwise, the adaptive mode switch 97-*f* transmits a control signal to the multiplexer 97-*g* to pass the single or plurality of native instructions fetched from the PINI-LCA 93 or from the NIPI-LCA 96 via the PINI-IDU 97-*c*.

In other embodiment, the multiplexer 97-*g* controlled by the adaptive mode switch 97-*f* finally delivers one of the prefetched native instructions either from the bank of the PINI cache or from the bank of the NIPI cache to the instruction fetch unit 98-*a*. The multiplexer 97-*g* integrated with the adaptive mode switch 97-*f* sets a path of the native instruction fetched from the AIM system A-3 for fetching the native instructions to the microprocessor 98. The multiplexer 97-*g* in the AIM controller 97 forwards a single or plurality of native instructions received from the AIM controller 97 to the instruction fetch unit 98-*a* after receiving the request.

The multiplexer 97-*g* receives a control signal from the adaptive mode switch 97-*f* to pass the single or plurality of native instructions fetched from the PINI-LCA if the PINI fetching mode is set. Otherwise, the multiplexer 97-*g* receives a control signal from the adaptive mode switch 97-*f* to pass the single or plurality of native instructions fetched from the PINI-LCA 93 or from the NIPI-LCA 96 via the PINI-IDU 97-*c*.

The multiplexer 97-*g* transmits one of the single or plurality of native instructions delivered from the PINI-LCA 93 via the PINI-IDU 97-*c* or from the NIPI-LCA 96 via the PINI-IDU 97-*c* according to the control signal received from the adaptive mode switch 97-*f*. The native instructions from the PINI-LCA 93 via the PINI-IDU 97-*c* are passed to the multiplexer 97-*g* after the PINI-IDU 97-*c* identifies the non-packed native instructions 44.

The multiplexer 97-*g* receives only the native instruction through the port (a), the PINI-IDU 97-*c* evaluates and identifies each PINI received upon receiving the cache hit signal from the PINI-LCA 93. Similarly, the multiplexer 97-*g* receives a single or plurality of native instructions accessed from the addresses received from the NIPI-FPC 97-*d* from the NIPI-LCA 96 through the port (c) via the PINI-IDU 97-*c* if those native instructions are stored in the NIPI-LCA 96. One or multiple prefetched native instructions are directly forwarded to the port (c) of the multiplexer 97-*g* via the PINI-IDU 97-*c* while the prefetched single or plurality of NIPIs 42 are stored to the NIPI-LCA 96 via the NIPI-UCA 95.

A conventional microprocessor typically consists of an instruction fetch unit and datapaths. The microprocessor 98 includes the instruction fetch unit 98-*a* and the program counter 98-*b*. The microprocessor 98 fetches and executes native instructions. The microprocessor 98 is interfaced through the AIM controller 97. The microprocessor sends out an address of the instruction to be fetched by asserting the content of the program counter via the instruction fetch unit. The address from the microprocessor is selectively forwarded to the single or plurality of active program counters for fetching the PINIs or the PINI-IDU 97-*c*. The microprocessor 98 receives only the native instructions, such as NIPIs 42 and non-packed native instructions 44, from the AIM controller 97.

The microprocessor 98 continues to increase the program counter value until the microprocessor needs to change the program counter value to the branch target location. Therefore, the program counter value of the microprocessor 98 can be different from the PINI fetch program counter value after fetching the single or plurality of native instructions of the NIPIs 42. In order to resume fetching PINIs according to the program counter value of the microprocessor 98, the active fetch program counter values for the PINIs need to be synchronized with the program counter value of the microprocessor 98 whenever the microprocessor 98 updates the program counter value with the branch target location. When the microprocessor 98 updates the program counter value for taking a branch instruction in the loop that is packed as a packed instruction, the branch target address in the program counter is passed to the PINI-IDU 97-*c*.

The instruction fetch unit 98-*a* in the microprocessor includes the program counter 98-*b* in order to fetch a single or plurality of instructions. The instruction fetch unit 98-*a* asserts the content of the program counter 98-*b* in the microprocessor 98 as an address of the instruction to fetch the instruction. The instruction fetch unit 98-*a* in the microprocessor 98 transmits the instruction fetching request from the program counter to the AIM controller 97.

The instruction fetch unit 98-*a* receives only the native instructions either fetched from non-packed native instructions 44 of the PINIs 41 or NIPIs 42 from the multiplexer 97-*g* via the PINI-IDU 97-*c*. The instruction fetch unit 98-*a* transmits an instruction fetch request to the adaptive mode switch 97-*f* in the AIM controller 97 via the program counter 98-*b*. The instruction fetch unit 98-*a* receives a single or plurality of native instructions from the AIM controller 97 after transmitting the request via the multiplexer 97-*g* in the AIM controller 97.

The program counter 98-*b* transmits the value stored to the adaptive mode switch 97-*f* for fetching a single or plurality of native instructions. The program counter 98-*b* updates a new value for fetching the next single or plurality of native instructions by increasing the value with the predefined offset value or the new value passed from the instruction fetch unit 98-a as similar to microprocessors in prior arts.

The components explained are interconnected to each other for swift delivery of the adaptive and/or native instructions missed from the cache memories, the adaptive and/or native instructions accessed from the PINI-MEM 91 and the NIPI-MEM 94. Consequently, the branch miss prediction penalty can be mitigated while significantly enhancing the instruction cache hit rate with small, simple, and fast instruction cache memory, such as direct mapped cache, that has faster access time, lower energy consumption, and smaller area than the same size of the set associative cache.

FIG. 6 is one embodiment of a microprocessor system including the AIM system A-3 that consists of the PINI program counters (PINI-PCs) 107, NIPI program offsets (NIPI-POs) 104, NIPI program counters (NIPI-PCs) 105, adjusting program counters (ADJ-PCs) 106, address comparators 101, instruction fetching and prefetching (IFP) mode switches 102, and address generators 103. Certain embodiments of the AIM system can be duplicated for a single or plurality of concurrent instruction prefetching and fetching operations. These components take inputs and/or outputs via multiplexors 114, 115, 116 and/or demultiplexors 117. The other components are the instruction detectors 110, the address generators 111 of the first native instruction of each NIPI, the prefetching starters 112, the branch target address generators and prefetching terminators 113, the multiplexor 118, the PINIs in sequential and/or concurrent accessible cache and main memories 108, and the NIPIs 42 in sequential and/or concurrent accessible cache and main memories 109. The microprocessor 98 can be typically found in prior arts.

A conventional microprocessor typically consists of an instruction fetch unit and datapaths. The microprocessor 98 includes an instruction fetch unit and a program counter. The microprocessor 98 fetches and executes native instructions. When the microprocessor 98 first sends the address of an instruction to the cache memory holding the PINI, a non-packed native instruction 44 can be directly prefetched and/or fetched from the cache memory (i.e., L1 cache) in sequential and/or concurrent accessible cache and main memories 108. If instead the address received from the microprocessor 98 is of a PANI 43, the native instructions in the associated NIPI 42 of the PANI 43 in the cache memory 109 are prefetched and/or fetched by obtaining the starting address of the set of the NIPI 42 from the address generators 111 of the first native instruction of each NIPI. In addition, the address generators 111 of the first native instruction of each NIPI generate reset signals for initializing the NIPI-PCs 105.

In one embodiment, the address comparators 101 receive a single or plurality of addresses for fetching instructions from the microprocessor 98. The address comparators 101 identify whether the addresses received from the microprocessor 98 are in the region of the NIPIs. The address comparators 101 also generate reset signals to reset the NIPI-PCs and the ADJ-PCs 106. The address comparators 101 continue to pass clock signals to the NIPI-PCs 105 and the ADJ-PCs 106 for fetching and/or prefetching NIPIs. Certain embodiments of the address comparators 101 can be duplicated for a single or plurality of concurrent instruction prefetching and fetching operations.

In one embodiment, the IFP mode switches 102 reflect currently prefetching and fetching instructions in either the PINI or the NIPI. Whenever a PANI 43 is fetched or prefetched, the IFP mode switches 102 are switched to the PINI fetching or prefetching mode. This PINI fetching or prefetching mode is switched back to the NIPI fetching or prefetching mode after the last native instruction of the NIPI 42 is fetched or prefetched. In one embodiment, the IFP mode switches 102 are initialized to the NIPI fetching mode and prefetching mode. The IFP mode switches 102 inform the instruction detectors 110 on the current instruction fetching and/or prefetching mode set. The IFP mode switches 102 receive instruction fetching and/or prefetching mode switching signals from the instruction detectors 110 when the last native instruction of the NIPI is detected. Certain embodiments of the IFP mode switches 102 can be duplicated for a single or plurality of concurrent instruction prefetching and fetching operations.

In one embodiment, the address generators 103 generate the addresses for prefetching and fetching the PINIs 41. The address generators 103 adjust the values of the PINI-PCs 107 for instruction fetch by subtracting the values of the addresses received from the microprocessor 98 from the values stored in the ADJ-PCs 106 whenever the mode is switched to NIPI fetching mode. Similarly, the address generators 103 also adjust the values of the PINI-PCs 107 for instruction prefetch by subtracting the values of the prefetch addresses from the values stored in the ADJ-PCs 106. The adjusted address values in the PINI-PCs 107 are used for fetching and/or prefetching instructions from the cache memory 108 holding the PINI. The address generators 103 also compute the physical addresses for accessing NIPIs 42 currently being fetched and/or prefetched by adding the values in the NIPI-POs 104 with the values in the NIPI-PCs 105 for fetching and/or prefetching. Certain embodiments of the address generators 103 can be duplicated for a single or plurality of concurrent instruction prefetching and fetching operations.

In one embodiment, the PINI-PCs 107 is one of the four types of program counters used for fetching and/or prefetching instructions from the PINIs 41 and NIPIs 42. The PINI-PCs 107 provide a counter for fetching and a counter for prefetching instructions from the instruction cache and main memories holding the PINI. The PINI-PCs 107 is initialized to zeroes. The PINI-PCs 107 receive the adjusted values from the address generators 103, which subtract the values of the addresses received from the microprocessor 98 from the values stored in the ADJ-PCs 106 for instruction fetch whenever the mode is switched to NIPI fetching mode. Similarly, PINI-PCs 107 receive the adjusted values from the address generators 103, which subtract the values of the prefetch addresses from the values stored in the ADJ-PCs 106 for NIPI prefetch.

After adjusting its values upon switching to the NIPI fetching mode or to NIPI prefetching mode, the values of the PINI-PCs 107 point to the locations of the next instructions in the PINI for the fetching and/or prefetching operations. Each PINI-PC 107 continues to be adjusted until a nonconsecutive address is received from the microprocessor 98. When a nonconsecutive address is received, the value of the PINI-PC 107 is synchronized with the nonconsecutive address received for the instruction fetching operation. The value of the PINI-PC 107 is also synchronized with the nonconsecutive address for the instruction prefetching operation when receiving the nonconsecutive address during the instruction prefetching operation. However, if the received nonconsecutive address is in the region of the NIPI, the instruction fetching mode is switched to the PINI fetching mode. In this case, the received nonconsecutive address value from the microprocessor 98 is stored to the NIPI-PO 104 and the NIPI-PC 105 is reset to zero. Certain embodiments of the PINI-PCs 107 can be duplicated for a single or plurality of concurrent instruction prefetching and fetching operations.

In one embodiment, the NIPI-POs 104 is one of the four types of program counters used for fetching and/or prefetching instructions from the PINIs 41 and NIPIs 42. The NIPI-POs 104 hold both the fetching and the prefetching addresses of the first native instructions of the NIPIs currently being fetched and prefetched. The NIPI-POs 104 and the NIPI-PCs 105 provide counters for fetching instructions and counters for prefetching instructions from the instruction cache and main memories holding the NIPI. If the instruction fetching mode or instruction prefetching mode is switched to the PINI instruction fetching mode or PINI instruction prefetching mode, the values in the NIPI-POs 104 for fetching and the values in the NIPI-POs 104 for prefetching are updated with the address values obtained from the PANIs 43 in the PINIs 41. The NIPI-POs 104 provide addenda for the address generators 103 to compute the physical addresses for accessing the NIPIs currently being fetched and/or prefetched. The NIPI-POs 104 hold the received nonconsecutive address value from the microprocessor 98 when the received nonconsecutive address is in the region of the NIPI. The NIPI-POs 104 is initialized to zeroes. Certain embodiments of the NIPI-POs 104 can be duplicated for a single or plurality of concurrent instruction prefetching and fetching operations.

In one embodiment, the NIPI-PCs 105 is one of the four types of program counters used for fetching and/or prefetching instructions from the PINIs 41 and NIPIs 42. The NIPI-PCs 105 receive reset signals for initializing themselves from the address generators 111 of the first native instruction of each NIPI. The NIPI-PCs 105 hold the values of the number of instructions both fetched and prefetched from the NIPI currently being fetched and prefetched. The NIPI-PCs 105 and the NIPI-POs 104 provide counters for fetching instructions and counters for prefetching instructions from the instruction cache and main memories holding the NIPI.

If the instruction fetching mode or instruction prefetching mode is switched to the NIPI fetching mode or NIPI prefetching mode, the values in the NIPI-POs 104 for fetching and the values in the NIPI-POs 104 for prefetching are reset to zeroes. The NIPI-POs 104 provide addenda for the address generators 103 to compute the physical addresses for accessing NIPIs 42 currently being fetched and/or prefetched. The values in the NIPI-PCs 105 for fetching are increased when new addresses are received from the microprocessor 98 until the mode is switched to NIPI fetching mode or NIPI prefetching mode. The NIPI-PCs 105 receive clock signals from the address comparators 101 for fetching and/or prefetching NIPIs. The NIPI-PCs 105 is initialized to zeroes. Certain embodiments of the NIPI-PCs 105 can be duplicated for a single or plurality of concurrent instruction prefetching and fetching operations.

In one embodiment, the ADJ-PCs 106 is one of the four types of program counters used for fetching and/or prefetching instructions from the PINIs 41 and NIPIs 42. The ADJ-PCs 106 hold the values of a single or plurality of instructions fetched and prefetched from the NIPI that have been fetched and prefetched since the address received from the microprocessor 98 was synchronized with the addresses used for fetching and prefetching.

The ADJ-PCs 106 provides a counter for fetching instructions and a counter for prefetching instructions from the instruction cache and main memories holding the PINI. The ADJ-PCs 106 are initialized to zeroes. The ADJ-PCs 106 provide the values of subtractors to the address generators 103, which subtract the values of the addresses received from the microprocessor 98 from the values received from the ADJ-PCs 106 for instruction fetch whenever the mode is switched to NIPI fetching mode. Similarly, ADJ-PCs 106 provide the values of subtractors to address generators 103, which subtract the values of the prefetch addresses from the values stored in the ADJ-PCs 106 for NIPI prefetch. The ADJ-PCs 106 receive reset signals from the address comparators 101 to be reset. The ADJ-PCs 106 also receive clock signals from the address comparators 101 for continuously fetching and/or prefetching NIPIs. Certain embodiments of the ADJ-PCs 106 can be duplicated for a single or plurality of concurrent instruction prefetching and fetching operations.

The sequential and/or concurrent accessible cache and main memories 108 hold the PINIs 41. These sequential and/or concurrent accessible cache and main memories 108 receive the addresses for fetching and/or prefetching the PINIs 41 from the microprocessor 98 via the address generators 103 and the PINI-PCs 107 when the current instruction fetching mode and/or prefetching mode are being used for the NIPI fetch and/or prefetch. The addresses given to the sequential and/or concurrent accessible cache and main memories 108 are adjusted by the address generators 103, which subtract the values of the addresses received from the microprocessor 98 from the values stored in the ADJ-PCs 106.

Similarly, the sequential and/or concurrent accessible cache and main memories 108 receive the adjusted addresses generated by the address generators 103, which subtract the values of the prefetch addresses from the values stored in the ADJ-PCs 106. The sequential and/or concurrent accessible cache and main memories 108 forward PINIs 41 to be fetched and/or prefetched to the instruction detectors 110.

The sequential and/or concurrent accessible cache and main memories 109 hold the NIPIs 42. These sequential and/or concurrent accessible cache and main memories 109 receive the addresses for fetching and/or prefetching instructions in the NIPI from the microprocessor 98 via the address generators 103 when the current instruction fetching mode and/or prefetching mode are being used for the NIPI fetch and/or prefetch. The addresses given to the sequential and/or concurrent accessible cache and main memories 109 are adjusted by the address generators 103, which add the values of the addresses received from the NIPI-POs 104 to the values stored in the NIPI-PCs 105.

Similarly, the sequential and/or concurrent accessible cache and main memories 109 receive the adjusted addresses generated by the address generators 103, which add the values of the prefetch addresses received from the NIPI-POs 104 to the values stored in the ADJ-PCs 106. The sequential and/or concurrent accessible cache and main memories 109 forward NIPIs to be fetched and/or prefetched to the instruction detectors 110.

In one embodiment, the instruction detectors 110 receive instructions from the PINIs 41 in sequential and/or concurrent accessible cache and main memories 108 as well as from the native instructions of PANIs 43 in sequential and/or concurrent accessible cache and main memories 109. The instruction detectors 110 receive the current instruction fetching mode and/or prefetching mode from the IFP mode switches 102. Instruction detectors 110 send instruction fetching and/or prefetching mode switching signals to the IFP mode switches 102 when the last native instruction in the NIPI is detected. Instruction detectors 110 forward NIPIs 42 to the microprocessor 98 via the multiplexor 118. Instruction detectors 110 distinguish between mixed PANIs 43 and non-packed native instructions in the received instructions from the PINIs 41. Instruction detectors 110 forward PANIs 43 to the address generators 111 of the first native instruction of each NIPI. If the instruction detectors 110 find any non-packed native instructions 44, these instructions are forwarded to the microprocessor 98 via the branch target address generators and prefetching terminators 113 and the multiplexor 118. If the instruction detectors 110 receive any cache miss signals from either the PINIs 41 or the NIPIs 42 in sequential and/or concurrent accessible cache and main memories 108, 109, cache miss signals are forwarded to the prefetching starters 112.

In one embodiment, the address generators 111 of the first native instruction of each NIPI receive PANIs 43 from the instruction detectors 110. The address generators 111 extract the starting address of NIPIs from the received PANI 43 and forward the generated starting address of the native instructions in the NIPI 42 stored in the sequential and/or concurrent accessible cache and main memories 109 to the NIPI-POs 104. In addition, the address generators 111 generate reset signals for initializing the NIPI-PCs 105.

In one embodiment, the prefetching starters 112 receive cache miss signals from the sequential and/or concurrent accessible cache and main memories 108, 109 via the instruction detectors 110 to initiate new prefetch operations if necessary.

In one embodiment, the branch target address generators and prefetching terminators 113 receive non-packed native instructions 44 from the instruction detectors 110 and forward these non-packed native instructions 44 to the microprocessor 98 via the multiplexor 118. The branch target address generators and prefetching terminators 113 generate branch target addresses of the branch instructions received and initiate prefetching termination operations. The current prefetching operations after receiving a native conditional branch instruction can be terminated by prefetching instructions from either the native branch target instruction or branch target instruction in a PANI 43 and from either the next non-packed native instruction 44 or the next PANI 43.

In one embodiment, the multiplexor 97-g contains some embodiments of multiplexors 114, 115, 116, and 118. The multiplexor 114 selects two inputs from the address comparators 101 and from the NIPI-POs 104 according to the input from the IFP mode switches 102. The multiplexor 114 forwards the input from the address comparators 101 to the address generators 103 if the current instruction fetching mode and/or prefetching mode are the NIPI fetching mode and/or prefetching mode. Otherwise, the multiplexor 114 forwards the input from the NIPI-POs 104 to the address generators 103.

The multiplexor 115 selects two inputs from the address comparators 101 and from the address generators 111 according to the input from the address comparators 101. The multiplexor 115 forwards the input from the address comparators 101 to the NIPI-POs 104 if the received instruction fetching and/or prefetching addresses from the microprocessor 98 are for fetching and/or prefetching instructions in the NIPI. Otherwise, the multiplexor 115 forwards the input from the address generators 111 to the NIPI-POs 104.

The multiplexor 116 selects two inputs from the NIPI-PCs 105 and from the ADJ-PCs 106 according to the input from the IFP mode switches 102. The multiplexor 116 forwards the input from the ADJ-PCs 106 to the address generators 103 if the current instruction fetching mode and/or prefetching mode are the NIPI fetching mode and/or prefetching mode. Otherwise, the multiplexor 116 forwards the input from the NIPI-PCs 105 to the address generators 103.

The multiplexor 118 selects two inputs from the branch target address generators and prefetching terminators 113 and from the instruction detectors 110 according to the input from the IFP mode switches 102. The multiplexor 118 forwards the input of the non-packed native instructions 44 from the branch target address generators and prefetching terminators 113 to the address generators 103 if the current instruction fetching mode and/or prefetching mode are the NIPI fetching mode and/or NIPI prefetching mode. Otherwise, the multiplexor 118 forwards the input of the reverted native instruction of the PANIs 43 from the instruction detectors 110 to the address generators 103.

Certain embodiments of the multiplexors used can be duplicated or extended for a single or plurality of concurrent instruction prefetching and fetching operations.

The demultiplexors 117 forward the input addresses of the PINIs 41 or the input addresses of the NIPIs 42 to the PINI-PCs 107 or the sequential and/or concurrent accessible cache and main memories 109 according to the control input from the IFP mode switches 102. The demultiplexors 117 forward the input from the address generators 103 to the PINI-PCs 107 if the current instruction fetching mode and/or prefetching mode are the NIPI fetching mode and/or NIPI prefetching mode. Otherwise, the demultiplexors 117 forward the input from the address generators 103 to the sequential and/or concurrent accessible cache and main memories 109.

What is claimed is:

1. An apparatus for producing an adaptive instruction prefetching and fetching memory system comprising:
   a static native instruction code (NIC) conversion system; and
   a dynamic adaptive instruction code (AIC) reversion system; wherein the apparatus for producing an adaptive instruction prefetching and fetching memory system is operable to:
   transform NIC comprising the native instructions compiled by a compiler running on a computer to AIC for delivering the same and compatible order of the native instructions to a microprocessor in a precise and timely manner via packed nonnative and non-packed native instruction (PINI) and/or native instructions and associative information of the packed nonnative instruction (NIPI) caches, which are at least two times faster than clock speed of the microprocessor; wherein the precise and timely manner delivering is to deliver the native instructions, which are possibly executed by the microprocessor, to the microprocessor with at least two times faster delivering speed than the clock speed of the microprocessor;
   generate the AIC comprising mixed PINIs as a first type of the AIC (FAIC), and NIPIs as a second type of the AIC (SAIC) for sequentially or concurrently prefetch and/or fetch PINIs and/or NIPIs to the microprocessor via the PINI and/or NIPI caches, which are at least two times faster than the clock speed of the microprocessor;
   transform the native instruction sequences in the NIC to the PINIs in the FAIC and the NIPIs in the SAIC by the compiler running on the computer before runtime;
   store the PINIs in the FAIC and the NIPIs in the SAIC to sequentially or concurrently accessible locations in a single or plurality of instruction memories;
   access sequentially or concurrently a single or plurality of the PINIs and/or the NIPIs stored in a single or plurality of PINI and/or NIPI caches accessing at least two times faster than the clock speed of the microprocessor during the PINI and/or NIPI prefetch and fetch operations;
   reduce fraction of the NIC by excluding and diminishing unconditional flow control native instructions used in the NIC from the PINIs in the FAIC and the NIPIs in the SAIC;
   reversely transform the PINIs in the FAIC with the NIPIs in the SAIC to the same or compatible order of native instructions during the PINI and NIPI fetch operations by the dynamic AIC reversion system;

access a PINI in the FAIC to reversely transform the associated NIPI to a single or plurality of native instructions transformed in the PINI before runtime by the dynamic AIC reversion system and deliver the single or plurality of native instructions to the microprocessor via the NIPI caches operating at least two times faster than the clock speed of the microprocessor;

transform subroutine call and return native instructions and a single or plurality of native instructions found in the subroutine in the NIC to a pair of PINI and NIPI by the compiler running on the computer in order to deliver the same or compatible order of the native instructions in the subroutine to the microprocessor for producing the same or compatible result within reduced time;

transform a loop comprising a plurality of native instructions in the NIC to a pair of PINI and NIPI by the compiler running on the computer in order to deliver the same or compatible order of the native instructions in the loop to the microprocessor for producing the same or compatible result within reduced time;

transform multi-level loops comprising a plurality of loops in hierarchical order in the NIC to a single loop in the AIC by transforming the outer loop in the NIC to a single loop in the AIC after transforming the inner loop in the NIC to a PINI and a single or plurality of NIPIs by the compiler running on the computer in order to deliver the same or compatible order of the native instructions in each level of loop to the microprocessor for producing the same or compatible result within reduced time; and prevent unauthorized usage of the PINIs and the NIPIs stored in the main PINI and NIPI memories by transforming orders of the PINIs and the NIPIs to the different sequences and/or allocating the PINIs and the NIPIs to the different locations in the single or plurality of main PINI and NIPI memories.

2. The apparatus for producing an adaptive instruction prefetching and fetching memory system of claim 1, wherein the static NIC conversion system is operable to:

identify and/or scale native instruction sequences in the NIC for transforming the native instruction sequences to the PINIs and the NIPIs by the compiler running on the computer;

alternatively generate the PINIs and the NIPIs directly from the high-level language program by integrating the NIC conversion methods to the compiler running on the computer;

remain a conditional branch native instruction in the NIC as a PINI for accurate native instruction fetch to the microprocessor by waiting for the branch target location, which is predicted or determined by the microprocessor;

transform a single or plurality of native instructions at a branch target location in the NIC to a PINI and a single or plurality of NIPIs by the compiler running on the computer if the single or plurality of native instructions at the branch target location is the first native instruction in the PINI;

scale a plurality of native instructions transformed into a PINI and a single or plurality of NIPIs by the compiler running on the computer in order to balance the PINI and NIPI cache and/or memory usage by addressing the native instructions in the NIPIs to the sequentially or concurrently accessible locations in NIPI caches and/or main NIPI memories;

analyze native instruction flow during the software compilation for parallel PINI and/or NIPI prefetch from the main PINI and/or NIPI memory to upper-level cache and pipelined, sequential, or concurrent PINI and/or NIPI prefetch or fetch from the upper-level cache to the lower-level cache;

sequentially or concurrently prefetch and/or fetch a single or plurality of PINIs and NIPIs at least two times faster than the clock speed of the microprocessor via the associated PINI and NIPI caches;

sequentially or concurrently deliver native instructions to the microprocessor at least two times faster than the clock speed of the microprocessor via the associated PINI and NIPI caches;

identify the border of the native instructions in basic block in the NIC and allocate different numbers of the PINIs and the NIPIs to the sequentially or concurrently accessible locations in the main PINI and/or NIPI memories and continue to place the PINIs and the NIPIs to partitioned caches; and extend to transform a plurality of concurrent threads found in the NIC to a plurality of PINIs and NIPIs by changing boundaries of the native instructions between a branch and the associated branch target native instructions to the native instructions between the beginning of a thread and the end of the thread by the compiler running on the computer;

allocate the transformed threads to the sequentially or concurrently accessible locations in the main instruction memories for sequentially or concurrently prefetching and/or fetching the transformed PINIs and NIPIs via the associated caches, which are at least two times faster than the clock speed of the multi-thread microprocessors.

3. The apparatus for producing an adaptive instruction prefetching and fetching memory system of claim 1, wherein the dynamic AIC reversion system further comprises:

a hierarchical cache memory organization comprising a single or plurality of main instruction memories and an associated single or plurality of the instruction caches, which are at least two times faster than the clock speed of the microprocessor, in the single or plurality of levels; and an adaptive instruction memory (AIM) controller; wherein the dynamic AIC reversion system is operable to:

store the PINIs in the FAIC and the NIPIs in the SAIC separately to sequentially or concurrently accessible locations in a single or plurality of banks of the main PINI and NIPI memories;

store the PINIs in the FAIC and the NIPIs in the SAIC in the sequentially or concurrently accessible locations in the instruction caches during the AIC revision;

sequentially or concurrently prefetch and/or fetch the PINIs in the FAIC and the NIPIs in the SAIC from the instruction caches, which are at least two times faster than the clock speed of the microprocessor;

revert the PINIs in the FAIC and the NIPIs in the SAIC to native instructions by accessing the PINIs in the FAIC from the single or plurality of banks in the main PINI memories via the PINI caches and then by accessing the NIPIs in the SAIC from the single or plurality of banks in the main NIPI memories via the NIPI caches;

revert the PINIs in the FAIC to all native instructions that are executable to the microprocessor during the instruction prefetching and/or fetching time dynamically by obtaining the native instructions from both of the associated NIPIs and PINIs, from the associated NIPIs, or from the PINIs if necessary;

revert a PINI representing the subroutine call native instruction to the single or plurality of the native instructions of the associated subroutine by directly fetching the reverted native instructions of the associated subroutine from sequentially or concurrently accessible locations in a single or plurality of NIPI caches or main NIPI memories to the microprocessor whose program counter value is not changed for jumping to and from the associated subroutine;

prefetch and/or fetch a single or plurality of the PINIs and/or the NIPIs in sequential, concurrent and/or pipelined manners from the sequentially or concurrently accessible locations in main PINI and/or NIPI memories and/or in at least two times faster instruction caches than the clock speed of the microprocessor;

prefetch and/or fetch a single or plurality of the PINIs in parallel for prefetching and/or fetching more PINIs by starting those instructions at the same time;

prefetch and/or fetch a single or plurality of the NIPIs in sequential or concurrent manners by accessing the NIPIs from the sequentially or concurrently accessible locations in a single or plurality of the at least two times faster instruction caches than the clock speed of the microprocessor and/or by assessing the NIPIs in a single or plurality of the main NIPI memories;

prefetch and/or fetch the PINIs in concurrent manners while prefetching other PINIs and/or the NIPIs from the sequentially or concurrently accessible locations in a single or plurality of the at least two times faster instruction caches than the clock speed of the microprocessor and/or by assessing other PINIs and/or the NIPIs in a single or plurality of the main PINI and/or NIPI memories;

dynamically and separately fetch a single or plurality of the PINIs from the sequentially or concurrently accessible locations in the at least two times faster instruction caches than the clock speed of the microprocessor and/or by assessing the PINIs from main PINI memories according to the same or compatible order of the native instructions in the NIC by switching the paths of the native instructions stored in the sequentially or concurrently accessible locations in NIPI instruction caches and/or main NIPI memories;

terminate prefetching and/or fetching of the single or plurality of the NIPIs by detecting the last native instruction of each NIPI;

terminate the prefetching operations of the PINI after prefetching a conditional branch native instruction by prefetching the PINI from either the branch target native instruction or branch target native instruction in a PINI and from the next native instruction from the associated NIPI;

precisely terminate the instruction prefetch whenever the conditional branch native instruction is detected more specifically by terminating current prefetching operations after prefetching PINIs in two different paths comprising one path for a branch target native instruction or branch target native instruction at the beginning of a PINI and another path for a PINI right after the detected conditional branch native instruction;

continue to prefetch and/or fetch the next PINIs from the branch target locations if unconditional branch native instructions, which provide their branch target addresses, are detected;

continue to prefetch and/or fetch the next PINIs from the branch target locations if branch predicted conditional branch native instructions, which provide their branch target addresses, are detected;

adjust the addresses for prefetching and/or fetching the PINIs in the FAIC and the NIPIs in the SAIC;

synchronize the addresses used for prefetching and/or fetching the PINIs with the addresses received from the microprocessor after completing the fetching and/or prefetching operations of the PINIs; and compensate for multi-cycle instruction cache or even longer main memory access time by prefetching early an ample plurality of native instructions as a single PINI concurrently and fetching the prefetched native instructions in the same or compatible NIC order.

4. The dynamic AIC reversion system of claim 3, wherein the hierarchical cache memory organization comprising the single or plurality of main instruction memories and the associated single or plurality of instruction caches operating a least two times faster than the clock speed of the microprocessor in the single or plurality of levels are operable to:

hold the PINIs in the sequentially or concurrently accessible locations in a single or plurality of memory banks in the main PINI memory;

prefetch and/or fetch the PINIs from a single or plurality of the lower level PINI caches via a single or plurality of the upper level PINI caches concurrently or sequentially operating at least two times faster than the clock speed of the microprocessor;

hold the NIPIs in the sequentially or concurrently accessible locations in a single or plurality of memory banks in the main NIPI memory; and prefetch and/or fetch the NIPIs from the sequentially or concurrently accessible locations in a single or plurality of the lower level NIPI caches via a single or plurality of the upper level NIPI caches concurrently or sequentially operating at least two times faster than the clock speed of the microprocessor.

5. The dynamic AIC reversion system of claim 3, wherein the AIM controller comprising:

a single or plurality of active PINI-PPCs and active PINI-FPCs;

a single or plurality of active NIPI-PPCs and active NIPI-FPCs;

a PINI identifier and prefetch unit;

an adaptive mode switch; and a plurality of multiplexers and demultiplexers;

wherein the AIM controller is operable to:
prefetch and fetch a single or plurality of the PINIs allocated in sequentially or concurrently accessible locations in the PINI caches operating at least two times faster than the clock speed of the microprocessor;

prefetch and fetch a single or plurality of the NIPIs allocated in sequentially or concurrently accessible locations in the NIPI caches operating at least two times faster than the clock speed of the microprocessor according to the NIPI operation order obtained from the associated PINI; and terminate a single or plurality of the PINI and/or NIPI prefetches by prefetching the next PINI and the PINI at the branch target location for reducing branch misprediction penalty and by identifying availability of PINI-PPCs and PINI-FPCs for storing addresses of the PINIs and NIPI-PPCs and NIPI-FPCs for storing addresses of the NIPIs.

6. The AIM controller of claim 5, wherein the single or plurality of active PINI-PPCs and active PINI-FPCs are further operable to:

receive the PINI fetch address from the adaptive mode switch via the PINI identifier and prefetch unit if the PINI fetch mode is set;

fetch a single or plurality of PINIs from the already prefetched PINIs according to the PINI operation order determined by a single or plurality of PINI-FPCs or by the new program counter value received from the microprocessor during the PINI fetch mode;

forward the copies of the stored PINI fetch addresses to the single or plurality of active PINI-PPCs;

update the associated single or plurality of active PINI-FPC values for fetching the next single or plurality of the PINIs whenever receiving the PINI fetch request from the microprocessor;

receive the copies of the stored PINI fetch addresses from the single or plurality of active PINI-FPCs for the PINIs whenever a new PINI program counter value is stored to the active PINI-FPCs for the PINIs;

store the received PINI fetch address to one of the available PINI-PPCs; and assert a single or plurality of PINI prefetch addresses to the single or plurality of lower level PINI cache banks.

7. The single or plurality of active PINI-PPCs and active PINI-FPCs of claim 6, wherein the PINI program counters are further operable to:

provide a single or plurality of counters for fetching and/or prefetching PINIs from the PINI caches and the main PINI memories holding the PINIs;

receive the adjusted values from the address generators, which subtract the values of the addresses received from the microprocessor from the values stored in the adjusting program counters for PINI fetch whenever the fetch mode is switched to the NIPI fetch mode;

receive the adjusted values from the address generators, which subtract the values of the prefetch addresses from the values stored in the adjusting program counters for the NIPI prefetch;

point to the locations of the next PINIs in the FAIC for the fetch and/or prefetch operations after adjusting its values upon switching to the NIPI fetch mode or prefetch mode;

continue to be adjusted until a non-consecutive PINI address is received from the microprocessor;

be synchronized with the non-consecutive PINI address received for the PINI fetch operation when a non-consecutive PINI address is received;

be also synchronized with the non-consecutive PINI address for the instruction prefetch operation when receiving the non-consecutive PINI address during the PINI prefetch operation;

be not synchronized with the non-consecutive PINI address when the PINI fetch mode is switched to the NIPI fetch mode since the received non-consecutive PINI address is in the address of the NIPI;

allow storing the received non-consecutive PINI address value from the microprocessor to the NIPI program offsets if not synchronized after receiving the non-consecutive PINI address;

allow resetting the NIPI program counters; and be duplicated for a single or plurality of concurrent PINI prefetch and fetch operations.

8. The AIM controller of claim 5, wherein the single or plurality of active NIPI-PPCs and active NIPI-FPCs further comprise:

NIPI program offsets; and

NIPI program counters; wherein the single or plurality of active NIPI-PPCs and active NIPI-FPCs is further operable to:

receive a single or plurality of NIPI fetch addresses from the PINI identifier and prefetch unit;

store the received single or plurality of NIPI fetch addresses obtained from the PINIs identified by extracting the starting address fields from the identified PINIs to a single or plurality of available NIPI-FPCs;

hold addresses of the single or plurality of NIPI fetch operations in the single or plurality of active NIPI-FPCs for the PINI identifier and prefetch unit to terminate the single or plurality of NIPI fetch operations when the PINI identifier and prefetch unit identifies the information of the last native instructions of the NIPI from the single or plurality of lower level NIPI cache banks;

invalidate the single or plurality of associated active NIPI-FPCs to complete fetch cycles of the NIPI;

receive the single or plurality of newly stored NIPI-FPC values from the single or plurality of active NIPI-FPCs for the NIPIs whenever a new program counter value is stored to the active NIPI-FPCs for the NIPIs;

hold the received program counter values to a single or plurality of NIPI-PPCs of the NIPIs;

forward the values of the single or plurality of NIPI-PPCs to the single or plurality of lower level NIPI cache banks;

receive a single or plurality of prefetch termination signals from the PINI identifier and prefetch unit that evaluates the prefetched associative information of the NIPIs if the PINI identifier and prefetch unit receives the information of the last native instructions of the NIPI;

invalidate the single or plurality of associated NIPI-PPCs to complete prefetch cycles of the NIPIs;

increment the associated single or plurality of NIPI-PPC values for prefetching the next single or plurality of the same NIPI if the PINI identifier and prefetch unit does not receive the information of the last native instructions of the NIPI; and assert a single or plurality of the prefetch addresses in the single or plurality of NIPI-PPCs to the single or plurality of lower level NIPI cache banks for the NIPIs in every cache accessing cycle.

9. The single or plurality of active NIPI-PPCs and active NIPI-FPCs of claim 8, wherein the NIPI program offsets are further operable to:

fetch and/or prefetch PINIs and NIPIs;

hold the fetch and/or the prefetch addresses of the first native instructions of the NIPI currently being fetched and/or prefetched;

provide a single or plurality of counters for fetching and/or prefetching NIPIs from the NIPI caches and main NIPI memories holding the NIPIs with the NIPI-PPCs and NIPI-FPCs;

update the values for fetching and/or prefetching with the address values obtained from the PINIs, if the current instruction fetch mode or prefetch mode is switched to the PINI fetch mode or prefetch mode;

provide information for the address generators to compute the physical addresses for accessing the NIPIs currently being fetched and/or prefetched;

hold the received non-consecutive address value from the microprocessor when the received non-consecutive address is in the address of the NIPI; and be duplicated for a single or plurality of concurrent NIPI prefetch and fetch operations.

10. The single or plurality of active NIPI-PPCs and active NIPI-FPCs of claim 8, wherein the NIPI program counters are further operable to:
fetch and/or prefetch PINIs and NIPIs;
receive reset signals for initializing themselves from the address generators of the first native instruction of each NIPI;
hold a single or plurality of the program counter values of the NIPIs currently being fetched and/or prefetched;
provide counter values for fetching and/or prefetching NIPIs from the NIPI caches and main NIPI memories with the NIPI program offsets;
reset the values in the NIPI program offsets, if the PINI fetch mode or prefetch mode is switched to the NIPI fetch mode or prefetch mode;
increase the values in the NIPI program counters for fetching NIPIs when new PINI addresses are received from the microprocessor until the mode is switched to the NIPI fetch mode or prefetch mode;
receive signals from the address comparators for fetching and/or prefetching NIPIs; and
be duplicated for a single or plurality of concurrent NIPI prefetch and fetch operations.

11. The AIM controller of claim 5, wherein the PINI identifier and prefetch unit further comprise:
a single or plurality of address generators;
a single or plurality of adjusting program counters;
a single or plurality of instruction detectors;
a single or plurality of address generators of the first native instruction of each NIPI;
a single or plurality of prefetching starters;
a single or plurality of branch target address generators and prefetch terminators; and
a plurality of multiplexors and demultiplexors; wherein the PINI identifier and prefetch unit is operable to:
receive the address of the PINI fetch from the adaptive mode switch;
forward a mode switching signal to the adaptive mode switch;
pass the native instructions to the assigned multiplexer after identifying the PINIs;
transmit a PINI fetch mode switching signal to the adaptive mode switch for delivering the single or plurality of native instructions fetched from the single or plurality of lower level PINI cache banks or from the single or plurality of lower level NIPI cache banks to the instruction fetch unit, if the native instruction fetch mode is set;
forward the received PINI fetch address from the adaptive mode switch to the single or plurality of active PINI-PPCs and PINI-FPCs if the PINI fetch mode is set;
receive the single or plurality of the PINIs and a cache hit or miss signal from the single or plurality of active PINI-PPCs and PINI-FPCs;
evaluate and identifies each PINI received and forwards only the non-packed native instruction comprising conditional branch native instruction, to the microprocessor upon receiving the cache hit signal;
postpone the aforementioned identification operation until it receives the cache hit signal if does not receive the cache hit signal;
forward a single or plurality of NIPI fetch addresses to the single or plurality of active NIPI-FPCs;
obtain the single or plurality of NIPI fetch addresses by extracting the starting address fields from the identified PINI;
receive the single or plurality of native instructions stored in the single or plurality of lower level NIPI cache banks at the NIPI addresses received from the single or plurality of active NIPI-PPCs and forward the native instructions to the microprocessor if the native instructions are stored in the single or plurality of lower level NIPI cache banks;
receive a cache hit signal from the single or plurality of lower level NIPI cache banks if any native instruction accessed is found in the single or plurality of lower level NIPI cache banks;
permit forwarding the same single or plurality of NIPI prefetch addresses received from the NIPI-PPCs to the single or plurality of upper level NIPI cache banks for accessing the NIPIs if any native instruction accessed is not found in the single or plurality of lower level NIPI cache banks;
receive the associative information of the single or plurality of prefetched native instructions and a cache hit signal;
evaluate the prefetched associative information of the NIPI and transmits a single or plurality of prefetch termination signals to the single or plurality of active NIPI-PPCs if it receives the information of the last native instructions of the NIPIs;
invalidate the single or plurality of associated NIPI-PPCs to complete prefetch cycles of the NIPIs;
increment the associated single or plurality of NIPI-PPC values for prefetching the next single or plurality of NIPIs of the same PINI;
terminate the single or plurality of NIPI fetch operations of the NIPIs addressed by the single or plurality of active NIPI-FPCs when identifying the information of the last native instructions of the NIPIs from the single or plurality of lower level NIPI cache banks;
invalidate the single or plurality of associated active NIPI-FPCs to complete NIPI fetch cycles;
transmit a mode switching signal to the adaptive mode switch for changing the current NIPI fetch mode to the PINI fetch mode; and
transmit the cache hit signal received from either the single or plurality of lower level PINI cache banks or the single or plurality of lower level NIPI cache banks to the instruction fetch unit whenever transmitting fetched a single or plurality of native instructions to the instruction fetch unit.

12. The PINI identifier and prefetch unit of claim 11, wherein the single or plurality of address generators is further operable to:
generate the single or plurality of addresses for prefetching and fetching the PINIs;
adjust the values of the PINI-FPCs by computing the values of the addresses received from the microprocessor from the values stored in the adjusting program counters whenever the mode is switched to the NIPI fetch mode;
adjust the values of the PINI-PPCs by computing the values of the prefetch addresses from the values stored in the adjusting program counters;
compute the physical addresses for accessing NIPIs currently being fetched and/or prefetched by computing the values in the NIPI program offsets with the values in the NIPI program counters for fetching and/or prefetching; and
be duplicated for a single or plurality of concurrent PINI prefetch and fetch operations.

13. The PINI identifier and prefetch unit of claim 11, wherein the single or plurality of adjusting program counters are further operable to:
fetch and/or prefetch PINIs and NIPIs;

hold the values of the NIPIs fetched and prefetched since the address received from the microprocessor was synchronized with the addresses used for fetching and prefetching next PINIs;

provide a counter for fetching PINIs and a counter for prefetching PINIs from the PINI caches and main PINI memories;

provide the computed values to the address generators, which compute the values of the addresses received from the microprocessor with the values received from the adjusting program counters for PINI fetch whenever the mode is switched to the NIPI fetch mode;

provide the computed values to address generators, which compute the values of the prefetch addresses from the values stored in the adjusting NIPI-PPCs. The adjusting NIPI-PPCs receive reset signals from the address comparators to be reset;

receive signals from the address comparators for continuously fetching and/or prefetching the NIPIs; and be duplicated for a single or plurality of concurrent PINI and/or NIPI prefetch and fetch operations.

14. The PINI identifier and prefetch unit of claim 11, wherein the single or plurality of instruction detectors are further operable to:

receive PINIs from the sequentially and/or concurrently accessible PINI caches and main PINI memories as well as from the NIPIs in sequentially and/or concurrently accessible caches and main NIPI memories;

receive current PINI or NIPI fetch mode and/or prefetch mode from the PINI/NIPI fetch and prefetch mode switches;

send PINI/NIPI fetch and/or prefetch mode switching signals to the PINI/NIPI fetch and prefetch mode switches when the last native instruction of each NIPI is detected;

forward the native instructions fetched from the NIPI caches and/or main NIPI memories to the microprocessor;

distinguish between the packed PINIs and non-packed PINIs received from the PINIs;

forward the PINIs to the address generators of the first native instruction of each NIPI;

find and forward any non-packed PINIs, which native instructions, to the microprocessor via the branch target address generators and prefetch terminators;

receive any cache miss signals from either the PINI and/or the NIPI in sequentially and/or concurrently accessible PINI and/or NIPI caches and main PINI and/or NIPI memories; and forward the received cache miss signals to the prefetch starters.

15. The PINI identifier and prefetch unit of claim 11, wherein the single or plurality of address generators of the first native instruction of each NIPI are further operable to:

receive the PINIs from the instruction detectors;

extract the starting address of the NIPI from the received PINI and forward the generated starting address of the native instructions in the NIPI stored in the sequentially and/or concurrently accessible NIPI caches and main NIPI memories to the NIPI program offsets; and generate reset signals for initializing the NIPI program counters.

16. The PINI identifier and prefetch unit of claim 11, wherein the single or plurality of prefetching starters are further operable to receive cache miss signals from the sequentially and/or concurrently accessible PINI caches and main PINI memories via the instruction detectors to initiate new prefetch operations if necessary.

17. The PINI identifier and prefetch unit of claim 11, wherein the single or plurality of branch target address generators and prefetching terminators are further operable to:

receive PINIs from the instruction detectors and forward the non-packed PINIs to the microprocessor;

generate branch target addresses of the branch native instructions received and initiate prefetch termination operations; and terminate the current prefetch operations after receiving a non-packed PINI comprising a conditional branch native instruction by prefetching PINIs from either the branch target native instruction or branch target native instruction in a packed PINI and from the next PINI.

18. The PINI identifier and prefetch unit of claim 11, wherein a plurality of multiplexors and demultiplexors are further operable to:

provide connections between the components inside and outside of the PINI identifier and prefetch unit;

select a plurality of inputs from the address comparators and from the NIPI program offsets according to the single of plurality of inputs from the PINI/NIPI fetch and prefetch mode switches;

forward the inputs from the address comparators to the address generators if the current fetch mode and/or prefetch mode is the NIPI fetch mode and/or prefetch mode;

forward the inputs from the NIPI program offsets to the address generators if the current fetch mode and/or prefetch mode is not the NIPI fetch mode and/or prefetch mode;

select a plurality of inputs from the address comparators and from the address generators according to the input from the address comparators;

forward the inputs from the address comparators to the NIPI program offsets if the received fetch and/or prefetch addresses from the microprocessor are for fetching and/or prefetching native instructions in the NIPI or NIPI;

forward the inputs from the address generators to the NIPI program offsets if the received fetch and/or prefetch addresses from the microprocessor are not for fetching and/or prefetching native instructions in the NIPIs or NIPIs;

select a plurality of inputs from the NIPI program counters and from the adjusting program counters according to the input from the PINI/NIPI fetch and prefetch mode switches;

forward the inputs from the adjusting program counters to the address generators if the current fetch mode and/or prefetch mode is the NIPI fetch mode and/or prefetch mode;

forward the inputs from the NIPI program counters to the address generators if the current fetch mode and/or prefetch mode is not the NIPI fetch mode and/or prefetch mode;

select a plurality of inputs from the branch target address generators and prefetch terminators and from the instruction detectors according to the input from the PINI/NIPI fetch and prefetch mode switches;

forward the inputs of the non-packed PINIs from the branch target address generators and prefetch terminators to the address generators if the current fetch mode and/or prefetch mode is the NIPI fetch mode and/or prefetch mode;

forward the inputs of the reverted native instruction of the PINIs from the instruction detectors to the address generators if the current fetch mode and/or prefetch mode is not the NIPI fetch mode and/or prefetch mode;

forward the input addresses of the PINI or the input addresses of the NIPI to the PINI program counters or the sequential and/or concurrent accessible PINI and/or NIPI caches and main PINI and/or NIPI memories according to the control inputs from the instruction fetching and prefetch mode switches;

forward the inputs from the address generators to the PINI program counters if the current instruction fetch mode and/or prefetch mode are the NIPI fetch mode and/or prefetch mode; and forward the inputs from the address generators to the sequentially and/or concurrently accessible NIPI caches and main NIPI memories if the current fetch mode and/or prefetch mode is not the NIPI fetch mode and/or prefetch mode.

19. The AIM controller of claim 5, wherein the adaptive mode switch being further comprising:

a single or plurality of address comparators; and the PINI/NIPI fetch and prefetch mode switches; wherein the PINI and the NIPI fetch and prefetch mode switches being further operable to:

reflect currently prefetching and fetching either the PINI or the NIPI;

switch to the NIPI fetch or prefetch mode whenever a PINI is fetched or prefetched;

initialize to the NIPI fetch mode and prefetch mode;

inform the instruction detectors on the current fetch and/or prefetch mode set;

receive fetch and/or prefetch mode switching signals from the instruction detectors when the last native instruction of the NIPI is detected; and be duplicated for a single or plurality of concurrent prefetch and fetch operations;

wherein the single of plurality of address comparators being further operable to:

receive a single or plurality of addresses for initiating fetch operations from the microprocessor;

identify whether the addresses received from the microprocessor are in the address of the NIPI;

generate reset signals to reset the NIPI program counters and the adjusting program counters;

continue to pass signals to the NIPI program counters and the adjusting program counters for fetching and/or prefetching NIPIs; and be duplicated for a single or plurality of concurrent instruction prefetch and fetch operations.

20. The AIM controller of claim 5, wherein the multiplexer being further operable to:

be controlled by the adaptive mode switch which finally delivers one of the prefetched native instructions either from the PINI cache banks or from the NIPI cache banks to the instruction fetch unit;

be integrated with the adaptive mode switch to set a path of the native instruction fetched from the AIM system for fetching the native instructions to the microprocessor;

forward a single or plurality of native instructions received from the AIM controller to the instruction fetch unit after receiving the request;

receive a single or plurality of control signals from the adaptive mode switch to pass the single or plurality of native instructions fetched from the single or plurality of lower level PINI cache banks if the PINI fetch mode is set;

receive a single or plurality of control signals from the adaptive mode switch to pass the single or plurality of native instructions fetched from the single or plurality of lower level PINI cache banks or from the single or plurality of lower level NIPI cache banks via the PINI identifier and prefetch unit if the PINI fetch mode is not set;

transmit the single or plurality of native instructions delivered according to the native instruction fetch order from the single or plurality of lower level PINI cache banks via the PINI identifier and prefetch unit or from the single or plurality of lower level NIPI cache banks via the PINI identifier and prefetch unit according to the control signal received from the adaptive mode switch;

receive The native instructions from the single or plurality of lower level PINI cache banks via the PINI identifier and prefetch unit after the PINI identifier and prefetch unit identifies the non-packed PINIs;

receive the native instructions while the PINI identifier and prefetch unit evaluates and identifies each PINI received upon receiving the cache hit signal from the single or plurality of lower level PINI cache banks;

receive a single or plurality of native instructions accessed from the addresses received from the single or plurality of prefetch program counters of the NIPI from the single or plurality of lower level NIPI cache banks through one of the ports via the PINI identifier and prefetch unit if the native instructions are stored in the single or plurality of lower level NIPI cache banks; and receive one or multiple prefetched native instructions from one of the ports via the PINI identifier and prefetch unit while the prefetched single or plurality of NIPIs are stored to the single or plurality of lower level NIPI cache banks via the single or plurality of upper level NIPI cache banks.

* * * * *